US012535750B2

(12) United States Patent
Aoki et al.

(10) Patent No.: US 12,535,750 B2
(45) Date of Patent: Jan. 27, 2026

(54) TONER

(71) Applicant: CANON KABUSHIKI KAISHA, Tokyo (JP)

(72) Inventors: Kenji Aoki, Shizuoka (JP); Takashi Matsui, Shizuoka (JP); Takayuki Toyoda, Shizuoka (JP); Tsutomu Shimano, Tokyo (JP); Shohei Shibahara, Shizuoka (JP); Yuna Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 724 days.

(21) Appl. No.: 17/805,357

(22) Filed: Jun. 3, 2022

(65) Prior Publication Data

US 2022/0326633 A1 Oct. 13, 2022

Related U.S. Application Data

(63) Continuation of application No. PCT/JP2020/046288, filed on Dec. 11, 2020.

(30) Foreign Application Priority Data

Dec. 12, 2019 (JP) ................................ 2019-224134

(51) Int. Cl.
*G03G 9/087* (2006.01)

(52) U.S. Cl.
CPC ..... *G03G 9/08797* (2013.01); *G03G 9/08724* (2013.01); *G03G 9/08728* (2013.01); *G03G 9/08782* (2013.01)

(58) Field of Classification Search
CPC ........... G03G 9/08797; G03G 9/08728; G03G 9/09733
See application file for complete search history.

(56) References Cited

U.S. PATENT DOCUMENTS 7,141,342 B2 11/2006 Toyoda
7,264,910 B2 9/2007 Toyoda
7,288,357 B2 10/2007 Toyoda
7,678,523 B2 3/2010 Hiroko
7,833,685 B2 11/2010 Tanaka
7,833,687 B2 11/2010 Kato
7,842,446 B2 11/2010 Yanase
7,923,190 B2 4/2011 Magome
7,935,467 B2 5/2011 Dojo
8,211,606 B2 7/2012 Murai
8,377,616 B2 2/2013 Tani
8,426,091 B2 4/2013 Magome
8,426,094 B2 4/2013 Magome
8,603,712 B2 12/2013 Aoki
8,614,044 B2 12/2013 Matsui
8,628,899 B2 1/2014 Kawamura
8,652,725 B2 2/2014 Watanabe
8,697,327 B2 4/2014 Shibata
8,741,519 B2 6/2014 Watanabe
8,778,585 B2 7/2014 Matsui
8,785,101 B2 7/2014 Kaya
8,815,484 B2 8/2014 Tanaka
8,841,054 B2 9/2014 Dojo
8,846,284 B2 9/2014 Kinumatsu
8,883,389 B2 11/2014 Matsui
8,916,319 B2 12/2014 Ikeda
8,940,467 B2 1/2015 Hashimoto
9,097,997 B2 8/2015 Nomura
9,146,485 B2 9/2015 Tani
9,158,216 B2 10/2015 Shimano
9,213,250 B2 12/2015 Nomura
9,217,943 B2 12/2015 Matsui
9,229,345 B2 1/2016 Ikeda
9,239,528 B2 1/2016 Hasegawa
9,304,422 B2 4/2016 Matsui
9,309,349 B2 4/2016 Watanabe
9,348,246 B2 5/2016 Magome
9,354,545 B2 5/2016 Matsui
9,377,705 B2 6/2016 Shimano
9,383,668 B2 7/2016 Noji
9,429,860 B2 8/2016 Kinumatsu
(Continued)

FOREIGN PATENT DOCUMENTS

CN 103238115 A 8/2013
CN 106019872 A 10/2016
(Continued)

OTHER PUBLICATIONS

U.S. Appl. No. 17/658,174, Kenji Aoki, filed Apr. 6, 2022.
U.S. Appl. No. 17/658,352, Yuna Yamamoto, filed Apr. 7, 2022.
U.S. Appl. No. 17/660,138, Keisuke Adachi, filed Apr. 21, 2022.
U.S. Appl. No. 17/804,879, Hirofumi Kyuushima, filed Jun. 1, 2022.
U.S. Appl. No. 17/804,880, Tomoya Nagaoka, filed Jun. 1, 2022.
U.S. Appl. No. 17/804,882, Naoya Isono, filed Jun. 1, 2022.
U.S. Appl. No. 17/804,883, Takayuki Toyoda, filed Jun. 1, 2022.
U.S. Appl. No. 17/819,385, Daisuke Yoshiba, filed Aug. 12, 2022.
(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a binder resin and a release agent, wherein the binder resin comprises a crystalline resin A, the crystalline resin A comprises a monomer unit derived from a monomer (a), the monomer (a) is at least one selected from the group consisting of (meth) acrylic acid esters having an alkyl group with 18 to 36 carbon atoms, the peak temperature and endothermic quantity at an endothermic peak derived from the crystalline resin A in DSC measurements using the toner satisfy specific relationships, and the release agent is at least one selected from the group consisting of hydrocarbon-based waxes and ester waxes.

8 Claims, No Drawings

(56) References Cited

U.S. PATENT DOCUMENTS

| | | | |
|---|---|---|---|
| 9,442,416 | B2 | 9/2016 | Magome |
| 9,442,419 | B2 | 9/2016 | Wakabayashi |
| 9,500,972 | B2 | 11/2016 | Tanaka |
| 9,556,290 | B2 | 1/2017 | Nishiura |
| 9,575,424 | B2 | 2/2017 | Nakagawa |
| 9,581,934 | B2 | 2/2017 | Ito |
| 9,599,919 | B2 | 3/2017 | Isono |
| 9,625,844 | B2 | 4/2017 | Kaya |
| 9,658,546 | B2 | 5/2017 | Tanaka |
| 9,658,554 | B2 | 5/2017 | Kinumatsu |
| 9,715,187 | B2 | 7/2017 | Mukumoto |
| 9,785,068 | B2 | 10/2017 | Umeda |
| 9,785,071 | B2 | 10/2017 | Shimano |
| 9,798,256 | B2 | 10/2017 | Kosaki |
| 9,798,262 | B2 | 10/2017 | Toyoizumi |
| 9,811,016 | B2 | 11/2017 | Aoki |
| 9,823,595 | B2 | 11/2017 | Toyoizumi |
| 9,829,814 | B2 | 11/2017 | Yoshida |
| 9,829,816 | B2 | 11/2017 | Tanaka |
| 9,835,964 | B2 | 12/2017 | Yoshida |
| 9,857,707 | B2 | 1/2018 | Tsuda |
| 9,857,711 | B2 | 1/2018 | Yoshida |
| 9,857,713 | B2 | 1/2018 | Kosaki |
| 9,869,943 | B2 | 1/2018 | Aoki |
| 9,880,478 | B2 | 1/2018 | Shimano |
| 9,904,195 | B2 | 2/2018 | Matsui |
| 9,921,501 | B2 | 3/2018 | Mochizuki |
| 9,952,523 | B2 | 4/2018 | Shimano |
| 10,012,919 | B2 | 7/2018 | Matsui |
| 10,114,303 | B2 | 10/2018 | Katsura |
| 10,156,800 | B2 | 12/2018 | Tsuda |
| 10,197,934 | B2 | 2/2019 | Matsui |
| 10,241,430 | B2 | 3/2019 | Kimura |
| 10,303,074 | B2 | 5/2019 | Yamawaki |
| 10,409,180 | B2 | 9/2019 | Koji |
| 10,416,582 | B2 | 9/2019 | Nakagawa |
| 10,429,757 | B2 | 10/2019 | Yoshida |
| 10,437,165 | B2 | 10/2019 | Shimano |
| 10,503,090 | B2 | 12/2019 | Tominaga |
| 10,545,422 | B2 | 1/2020 | Yamawaki |
| 10,656,545 | B2 | 5/2020 | Kamae |
| 10,732,529 | B2 | 8/2020 | Yoshiba |
| 10,732,530 | B2 | 8/2020 | Matsui |
| 10,859,931 | B2 | 12/2020 | Hashimoto |
| 10,877,388 | B2 | 12/2020 | Aoki |
| 10,877,389 | B2 | 12/2020 | Kamikura |
| 10,877,390 | B2 | 12/2020 | Shimano |
| 10,969,704 | B2 | 4/2021 | Kagawa |
| 10,969,705 | B2 | 4/2021 | Shirayama |
| 11,112,709 | B2 | 9/2021 | Saeki |
| 11,181,844 | B2 | 11/2021 | Nagaoka |
| 11,181,845 | B2 | 11/2021 | Shimoda |
| 11,249,412 | B2 | 2/2022 | Kawamura |
| 11,262,666 | B2 | 3/2022 | Yoshiba |
| 11,287,758 | B2 | 3/2022 | Matsui |
| 2008/0299482 | A1 | 12/2008 | Kato |
| 2009/0197192 | A1 | 8/2009 | Hiroko |
| 2010/0035171 | A1 | 2/2010 | Watanabe |
| 2013/0266897 | A1 | 10/2013 | Aoki et al. |
| 2014/0205944 | A1 | 7/2014 | Masuda |
| 2014/0308611 | A1 | 10/2014 | Shimano |
| 2014/0356779 | A1 | 12/2014 | Hasegawa |
| 2014/0377697 | A1 | 12/2014 | Nishiura |
| 2015/0004539 | A1 | 1/2015 | Watanabe |
| 2015/0185658 | A1 | 7/2015 | Wakabayashi |
| 2016/0091811 | A1 | 3/2016 | Doi |
| 2016/0282740 | A1 | 9/2016 | Aoki et al. |
| 2019/0137901 | A1 | 5/2019 | Shimano et al. |
| 2019/0310564 | A1 * | 10/2019 | Koshima ............... C08F 220/68 |
| 2020/0341395 | A1 | 10/2020 | Ookubo |
| 2021/0132518 | A1 | 5/2021 | Honda |
| 2021/0132519 | A1 | 5/2021 | Hashimoto |
| 2021/0181646 | A1 | 6/2021 | Matsui |
| 2021/0181648 | A1 | 6/2021 | Shimano |
| 2021/0405549 | A1 | 12/2021 | Ookubo |
| 2022/0128915 | A1 | 4/2022 | Toyoda |
| 2022/0128916 | A1 | 4/2022 | Yoshida |
| 2022/0128919 | A1 | 4/2022 | Kawamura |

FOREIGN PATENT DOCUMENTS

| | | | | |
|---|---|---|---|---|
| CN | 110018621 | A | 7/2019 | |
| JP | 2014-130243 | A | 7/2014 | |
| JP | 2014-142632 | A | 8/2014 | |
| JP | 2016-66018 | A | 4/2016 | |
| JP | 2018-151619 | A | 9/2018 | |
| JP | 2018-156074 | A | 10/2018 | |
| JP | 2019-19652 | A | 12/2019 | |
| JP | 2019-219652 | A | 12/2019 | |
| WO | WO-2012011546 | A1 * | 1/2012 | ........... G03G 9/0804 |
| WO | 2013/047296 | A1 | 4/2013 | |
| WO | 2018/110593 | A1 | 6/2018 | |
| WO | 2019/225207 | A1 | 11/2019 | |

* cited by examiner

TONER

CROSS-REFERENCE TO RELATED APPLICATION

This application is a Continuation of International Patent Application No. PCT/JP2020/046288, filed Dec. 11, 2020, which claims the benefit of Japanese Patent Application No. 2019-224134, filed Dec. 12, 2019, both of which are hereby incorporated by reference herein in their entirety.

BACKGROUND OF THE INVENTION

Field of the Invention

The present disclosure relates to a toner for use in electrophotographic methods and electrostatic recording methods.

Background Art

Conventionally, energy saving is considered a serious technical issue for electrophotographic apparatuses, and significant reductions in the amount of heat applied the fixing unit are being studied. In particular, there is increased demand for toners with the property of "low-temperature fixability", which allows fixing with lower energy.

One way to enable fixing at low temperatures is to lower the glass transition temperature (Tg) of the binder resin in the toner. However, because the heat-resistant storage stability of the toner declines when the Tg is reduced, it is difficult to obtain a toner with both low-temperature fixability and heat-resistant storage stability by these methods.

Toners to which plasticizers are added have been considered as measures for tackling this issue (see PTL 1 and 2). Plasticizers have the effect of increasing the speed of softening of a binder resin while maintaining the Tg value of a toner, and can achieve both low-temperature fixability and heat-resistant storage stability. However, because toners soften as a result of a step in which a plasticizer melts and plasticizes a binder resin, the speed at which a toner melts is limited, and further improvements in low-temperature fixability are needed.

Therefore, methods using crystalline vinyl resins as binder resins are being studied in an effort to give toners further both low-temperature fixability and heat-resistant storage stability. The amorphous resins commonly used as toner binder resins do not exhibit clear endothermic peaks in differential scanning calorimetry (DSC), but an endothermic peak appears in DSC measurement when a crystalline resin component is included.

Crystalline vinyl resins have the property of hardly softening at all up to the melting point because the side chains in the molecule are regularly arranged. Crystals also melt suddenly at the melting point, accompanied by a rapid drop in viscosity. They are therefore of interest as materials with excellent sharp-melt properties that provide both low-temperature fixability and heat-resistant storage stability. Normally, crystalline vinyl resins have long-chain alkyl groups as side chains of the main chain skeleton, and exhibit crystallinity as resins because the long-chain alkyl groups of the side chains crystallize with each other.

PTL 3 proposes a toner having a core comprising a crystalline vinyl resin obtained by copolymerizing an amorphous polymerizable monomer with a polymerizable monomer having a long-chain alkyl group. This aims at achieving both low-temperature fixability and heat-resistant storage stability.

In addition, PTL 4 proposes a toner obtained using a crystalline vinyl resin obtained by copolymerizing a polymerizable monomer having a long chain alkyl group and a polymerizable monomer whose SP value is different from that of the aforementioned polymerizable monomer.

CITATION LIST

Patent Literature

[PTL 1] WO 2013/047296
[PTL 2] Japanese Patent Application Publication No. 2016-066018
[PTL 3] Japanese Patent Application Publication No. 2014-130243
[PTL 4] WO 2018/110593

SUMMARY OF THE INVENTION

However, it is understood that the toner disclosed in PTL 3 is poor in terms of fixed image rubfastness. Long chain alkyl groups have the characteristics of being highly hydrophobic and exhibiting low affinity for paper. Because the toner disclosed in PTL 3 has a high content of long chain alkyl groups, it is thought that adhesion between the fixed toner and a paper is low.

In addition, it is understood that the toner disclosed in PTL 4 tends to cause wraparound of paper on a fixing unit when printing is carried out at a high print percentage. Long chain alkyl groups exhibit high affinity for release agents, and these readily dissolve in each other. As a result, it is thought that the release agent cannot adequately exuded on the surface of an image and release properties cannot be achieved at the time of fixing.

Therefore, further improvements are needed in order to achieve a toner which exhibits excellent low-temperature fixability and heat-resistant storage stability and which also exhibits excellent release properties and fixed image rubfastness.

With problems such as those mentioned above in mind, the present disclosure provides a toner which exhibits excellent low-temperature fixability and heat-resistant storage stability and which also exhibits excellent release properties and fixed image rubfastness.

A toner comprising a toner particle comprising a binder resin and a release agent, wherein the binder resin comprises a crystalline resin A, the crystalline resin A comprises a monomer unit derived from a monomer (a), the monomer (a) is at least one selected from the group consisting of (meth)acrylic acid esters having an alkyl group with 18 to 36 carbon atoms, in differential scanning calorimetry (DSC) measurements of the toner, formulae (1) to (3) below are satisfied, and the release agent is at least one selected from the group consisting of hydrocarbon-based waxes and ester waxes;

$$50 \le Tp \le 70 \quad (1)$$

$$20 \le \Delta H \le 70 \quad (2)$$

$$0.00 \le \Delta H_{Tp-3}/\Delta H \le 0.30 \quad (3);$$

in formulae (1) to (3),

Tp (° C.) denotes peak temperature of an endothermic peak derived from the crystalline resin A in a first temperature increase, ΔH (J/g) denotes an endothermic quantity of the endothermic peak derived from the crystalline resin A in the first temperature increase, and $\Delta H_{Tp\text{-}3}$ (J/g) denotes an endothermic quantity from a temperature 20.0° C. lower than Tp to a temperature 3.0° C. lower than Tp.

According to the present disclosure, it is possible to provide a toner which exhibits excellent low-temperature fixability and heat-resistant storage stability and which also exhibits excellent release properties and fixed image rubfastness.

Further features of the present invention will become apparent from the following description of exemplary embodiments.

DESCRIPTION OF THE EMBODIMENTS

Unless otherwise specified, descriptions of numerical ranges such as “from XX to YY” or “XX to YY” in the present disclosure include the numbers at the upper and lower limits of the range.

A (meth)acrylic acid ester means an acrylic acid ester and/or a methacrylic acid ester.

In cases where numerical ranges are indicated incrementally, upper limits and lower limits of the numerical ranges can be arbitrarily combined.

The term “monomer unit” means a reacted form of a monomer substance in a polymer. For example, one unit is one carbon-carbon bond segment in a main chain of a polymer formed by polymerization (addition polymerization) of a vinyl-based monomer. The vinyl-based monomer can be represented by formula (C) below.

(C)

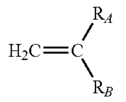

[in formula (C), $R_A$ represents a hydrogen atom or an alkyl group (preferably a $C_{1-3}$ alkyl group, or more preferably a methyl group), and $R_B$ represents any substituent].

A monomer unit derived from a (meth)acrylic acid ester means a monomer unit formed by a (meth)acrylic acid ester reacting, and indicates a form in which a C═C double bond in a (meth)acrylic acid ester has undergone addition polymerization. The same is true for monomer units derived from methacrylonitrile or monomer units derived from acrylonitrile.

A crystalline resin is a resin that exhibits a clear endothermic peak in differential scanning calorimetry (DSC).

The inventors of the present invention found that the problems mentioned above could be solved by optimizing the amount of long chain alkyl groups present in a binder resin and appropriately controlling interactions between long chain alkyl groups.

The present disclosure relates to a toner comprising a toner particle comprising a binder resin and a release agent, wherein the binder resin comprises a crystalline resin A, the crystalline resin A comprises a monomer unit derived from a monomer (a), the monomer (a) is at least one selected from the group consisting of (meth)acrylic acid esters having an alkyl group with 18 to 36 carbon atoms, in differential scanning calorimetry (DSC) measurements of the toner, formulae (1) to (3) below are satisfied, and the release agent is at least one selected from the group consisting of hydrocarbon-based waxes and ester waxes;

$$50 \le Tp \le 70 \quad (1)$$

$$20 \le \Delta H \le 70 \quad (2)$$

$$0.00 \le \Delta H_{Tp\text{-}3}/\Delta H \le 0.30 \quad (3);$$

in formulae (1) to (3),

Tp (° C.) denotes peak temperature of an endothermic peak derived from the crystalline resin A in a first temperature increase, ΔH (J/g) denotes an endothermic quantity of the endothermic peak derived from the crystalline resin A in the first temperature increase, and $\Delta H_{Tp\text{-}3}$ (J/g) denotes an endothermic quantity from a temperature 20.0° C. lower than Tp to a temperature 3.0° C. lower than Tp.

In order to achieve both low-temperature fixability and heat-resistant storage stability, the binder resin as a whole must be crystalline. In order to achieve this, sufficient crystallization must occur between long chain alkyl groups present as side chains of the main chain skeleton of the binder resin (formula (2)), and the content of long chain alkyl groups must be high and the melting point to be exhibited must fall within a suitable range (formula (1)) in order to ensure heat-resistant storage stability.

However, because long chain alkyl groups have low affinity for paper, it is understood that rubfastness is poor if the endothermic quantity of an endothermic peak is too high for a resin containing a long chain alkyl group. In order to ensure rubfastness, it is thought that the content of long chain alkyl groups must be kept to a minimum (formula (2)).

In addition, it was found that a low degree of peak tailing on the low-temperature side of an endothermic peak of the binder resin correlates with release performance, as shown by formula (3) above. Because interactions between long chain alkyl groups in the binder resin are strong, it is thought that phase separation from the release agent increases at the time of melting.

The toner will now be explained in greater detail.

The binder resin comprises a crystalline resin A. The crystalline resin A comprises a monomer unit derived from a monomer (a), and the monomer (a) is at least one selected from the group consisting of (meth)acrylic acid esters having an alkyl group with 18 to 36 carbon atoms. By comprising a monomer unit derived from the monomer (a), the crystalline resin A exhibits crystalline properties.

In differential scanning calorimetry (DSC) measurements of the toner, formula (1) below is satisfied.

$$50 \le Tp \le 70 \quad (1)$$

In formula (1), Tp (° C.) denotes peak temperature of an endothermic peak derived from the crystalline resin A in a first temperature increase. If the value of Tp falls within the range mentioned above, the toner can achieve both heat-resistant storage stability and low-temperature fixability. A Tp value of lower than 50° C. is advantageous in terms of low-temperature fixability, but heat-resistant storage stability of the toner significantly deteriorates. However, if the value of Tp exceeds 70° C., excellent heat-resistant storage stability is achieved, but low-temperature fixability deteriorates.

The value of Tp can be controlled by altering the type of the monomer (a), the proportion of monomer units derived from the monomer (a) in the crystalline resin A, or the type and quantity of monomer units derived from monomers other than the monomer (a).

The value of Tp (° C.) preferably satisfies formula (1') below.

$$55 \leq Tp \leq 65 \quad (1')$$

In addition, formula (2) below is satisfied in DSC measurements of the toner.

$$20 \leq \Delta H \leq 70 \quad (2)$$

ΔH (J/g) denotes the endothermic quantity of the endothermic peak derived from the crystalline resin A in the first temperature increase. ΔH reflects the proportion in the overall binder resin of a crystalline substance that is present in the toner in a state whereby crystalline properties are maintained. That is, even if a large quantity of a crystalline substance is present in the toner, ΔH decreases if crystalline properties are compromised. Therefore, a toner in which the value of ΔH falls within the range mentioned above has an appropriate proportion of the crystalline resin A, which maintains crystalline properties in the toner, and achieves good low-temperature fixability.

A ΔH value of less than 20 J/g indicates that the proportion of an amorphous resin is relatively high. As a result, the glass transition temperature (Tg) derived from an amorphous resin component becomes more influential. Therefore, it is difficult to achieve good low-temperature fixability.

If the value of ΔH exceeds 70 J/g, the proportion of the monomer (a) becomes too high and fixed image rubfastness deteriorates.

The value of ΔH can be controlled by altering the type of the monomer (a), the proportion of monomer units derived from the monomer (a) in the crystalline resin A, or the type and quantity of monomer units derived from monomers other than the monomer (a).

The value of ΔH (J/g) preferably satisfies formula (2') below, and more preferably satisfies formula (2") below.

$$30 \leq \Delta H \leq 60 \quad (2')$$

$$35 \leq \Delta H \leq 55 \quad (2')$$

In addition, formula (3) below is satisfied in DSC measurements of the toner.

$$0.00 \leq \Delta H_{Tp\text{-}3}/\Delta H \leq 0.30 \quad (3)$$

$\Delta H_{Tp\text{-}3}$ (J/g) denotes the endothermic quantity from a temperature 20.0° C. lower than Tp to a temperature 3.0° C. lower than Tp.

$\Delta H_{Tp\text{-}3}/\Delta H$ is focused on the low temperature side of an endothermic peak. Therefore, a $\Delta H_{Tp\text{-}3}/\Delta H$ value that falls within this range indicates that there is a low degree of peak tailing on the low temperature side of an endothermic peak derived from the crystalline resin A in the toner. It is thought that a low $\Delta H_{Tp\text{-}3}/\Delta H$ value indicates that interactions between long chain alkyl groups and the release agent do not occur. The reason for this is thought to be as follows.

The crystalline resin A is a crystalline vinyl resin having a monomer unit derived from a monomer (a) having a long chain alkyl group, has a long chain alkyl group as a side chain on the main chain skeleton of the vinyl resin, and exhibits crystalline properties as a resin as a result of interactions between long chain alkyl groups in side chains. Therefore, in a case where interactions between long chain alkyl groups are uniform and dense, it is thought that an endothermic peak becomes sharper and the degree of peak tailing on the low temperature side is lower.

Here, if a release agent is present in the toner, interactions between long chain alkyl groups are disrupted because long chain alkyl groups undergo interactions with the release agent. As a result, the degree of peak tailing on the low temperature side increases. Therefore, if the value of $\Delta H_{Tp\text{-}3}/\Delta H$ is less than 0.30, interactions between long chain alkyl groups are strong, interactions between long chain alkyl groups and the release agent are weak, and release properties are ensured. A preferred range for the value of $\Delta H_{Tp\text{-}3}/\Delta H$ is from 0.02 to 0.20.

Means for ensuring that the value of $\Delta H_{Tp\text{-}3}/\Delta H$ falls within the range mentioned above include weakening interactions between long chain alkyl groups and the release agent and strengthening interactions between long chain alkyl groups.

An example of such means is carrying out a heat treatment following production of the toner particle. By carrying out a heat treatment and applying thermal energy of which amount exceeds interactions between long chain alkyl groups and the release agent, it is possible to weaken interactions between long chain alkyl groups and the release agent and therefore strengthen interactions between long chain alkyl groups. Another example is a method comprising incorporating appropriate monomer units in the crystalline resin A. Appropriate monomer units are explained later.

The heat treatment temperature is preferably from Tp−20° C. to Tp−5° C. In addition, the duration of the heat treatment can be adjusted as appropriate, but it is generally preferable for this duration to be from 0.5 hours to 50 hours (and more preferably from 1.5 hours to 8 hours).

The crystalline resin A will now be explained. The crystalline resin A comprises a monomer unit derived from a monomer (a), and the monomer (a) is at least one selected from the group consisting of (meth)acrylic acid esters having an alkyl group with 18 to 36 carbon atoms.

Examples of (meth)acrylic acid esters having an alkyl group with 18 to 36 carbon atoms include (meth)acrylic acid esters having a straight-chain alkyl group with 18 to 36 carbon atoms [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, etc.] and (meth)acrylic acid esters having a branched alkyl group with 18 to 36 carbon atoms [2-decyltetradecyl (meth)acrylate, etc.].

Of these, at least one selected from the group consisting of (meth)acrylic acid esters having a straight-chain alkyl group with 18 to 36 carbon atoms is preferred from the standpoint of the storage stability of the toner, at least one selected from the group consisting of the (meth)acrylic acid esters having a straight-chain alkyl group with 18 to 30 carbon atoms is more preferred, and at least one selected from the group consisting of straight-chain stearyl (meth)acrylate and behenyl (meth)acrylate is still more preferred.

One kind alone or a combination of two or more kinds may be used for the monomer (a).

In addition to the monomer unit derived from the monomer (a), the crystalline resin A preferably further comprises a monomer unit derived from a monomer (b) that is different from the monomer (a). If SP(a) denotes the SP value $(J/cm^3)^{0.5}$ of the monomer unit derived from the monomer (a) and SP(b) denotes the SP value $(J/cm^3)^{0.5}$ of the monomer unit derived from the monomer (b), it is preferable for formula (5) below to be satisfied, and more preferable for formula (5') below to be satisfied.

$$3.00 \leq (SP_b - SP_a) \leq 25.00 \quad (5)$$

$$6.00 \leq (SP_b - SP_a) \leq 12.00 \quad (5')$$

If formula (5) above is satisfied, the crystalline properties of the crystalline resin A are unlikely to decrease and the melting point tends to be maintained. As a result, both low-temperature fixability and heat-resistant storage stability tends to be achieved. In addition, formula (3) above is more easily satisfied. It is thought that this mechanism is as follows.

The monomer unit derived from the monomer (a) is incorporated in the polymer, and crystalline properties are exhibited by monomer units derived from the monomer (a) aggregating with each other to form domains. In most cases, if other monomer units are included, crystallization tends to be inhibited and a polymer is therefore unlikely to exhibit crystalline properties. This tendency is notable if monomer units derived from the monomer (a) and other units are bonded in a random manner in a single molecule of the polymer.

However, if the value of $SP_b - SP_a$ falls within the range of formula (5) above, it is thought that the monomer (a) and the monomer (b) do not dissolve in each other and a clear phase separated state can be formed in the crystalline resin A, and it is thought that crystalline properties do not decrease and the melting point is readily maintained.

Moreover, in a case where the monomer (a) comprises two or more types of (meth)acrylic acid ester each having an alkyl group with 18 to 36 carbon atoms, $SP_a$ is expressed as an average value calculated from the molar proportions of the units derived from the monomers (a).

For example, in a case where a monomer unit A having an SP value denoted by $SP_{111}$ is contained at a quantity of A mol % based on the total number of moles of monomer units that satisfy requirements for the monomer unit derived from the monomer (a) and a monomer unit B having an SP value denoted by $SP_{112}$ is contained at a quantity of (100-A) mol % based on the total number of moles of monomer units that satisfy requirements for the monomer unit derived from the monomer (a), the SP value ($SP_{11}$) is such that $$SP_{11} = (SP_{111} \times A + SP_{112}(100 - A))/100$$

A similar calculation is performed in a case where three or more monomers that satisfy requirements for the monomer unit derived from the monomer (a) are contained.

However, in a case where the monomer (b) comprises two or more types of polymerizable monomer, $SP_b$ denotes the SP values of monomer units derived from each polymerizable monomer, and the value of $SP_b - SP_a$ is determined for monomer units derived from each monomer (b). That is, a monomer unit derived from the monomer (b) preferably has a $SP_b$ value that satisfies formula (5) with respect to the $SP_{11}$ value calculated using the method described above.

The monomer unit derived from the monomer (a) in the crystalline resin A has a content of preferably 5.0 mol % to 60.0 mol %, and more preferably 14.0 mol % to 25.0 mol %, based on the total number of moles of monomer units in the crystalline resin A. In addition, the monomer unit derived from the monomer (b) in the crystalline resin A has a content of preferably 20.0 mol % to 95.0 mol %, more preferably 20.0 mol % to 92.0 mol %, and further preferably 30.0 mol % to 65.0 mol %, based on the total number of moles of monomer units in the crystalline resin A.

If the content of the monomer unit derived from the monomer (a) in the crystalline resin A falls within the range mentioned above, sharp melt properties of the crystalline resin A are readily exhibited and a toner having excellent low-temperature fixability tends to be formed. Moreover, in a case where the crystalline resin A comprises units derived from two or more types of (meth)acrylic acid esters each having an alkyl group with 18 to 36 carbon atoms, the content of the monomer unit derived from the monomer (a) indicates the total molar ratio of these.

If the content of the monomer unit derived from the monomer (b) in the crystalline resin falls within the range mentioned above, crystallization of monomer units derived from the monomer (a) in the crystalline resin A is unlikely to be inhibited, and the melting point therefore tends to be maintained. In addition, formula (3) above is more easily satisfied.

In addition, in a case where two or more types of units derived from the monomer (b) that satisfy formula (5) above are present in the crystalline resin A, the proportion of units derived from the monomer (b) indicates the total molar proportion of these.

The monomer unit derived from the monomer (a) in the crystalline resin A has a content of preferably 25.0 mass % to 90.0 mass %, and more preferably 40.0 mass % to 60.0 mass %, based on the total mass of monomer units in the crystalline resin A. In addition, the monomer unit derived from the monomer (b) in the crystalline resin A has a content of preferably 5.0 mass % to 60.0 mass %, and more preferably 15.0 mass % to 40.0 mass %, based on the total mass of monomer units in the crystalline resin A.

Of those given below for example, a polymerizable monomer conforming to the formula (5) may be used as the monomer (b).

One kind of monomer alone or a combination of two or more kinds may be used for the monomer (b).

Monomers having nitrile groups: for example, acrylonitrile, methacrylonitrile and the like.

Monomers having hydroxy groups: for example, 2-hydroxyethyl (meth)acrylate, 2-hydroxypropyl (meth)acrylate, and the like.

Monomers having amide groups: for example, acrylamide and monomers obtained by reacting amines having 1 to 30 carbon atoms with carboxylic acids having ethylenically unsaturated bonds (acrylic acid, methacrylic acid, etc.) with 2 to 30 carbon atoms by known methods.

Monomers having urethane groups: for example, monomers obtained by reacting alcohols having ethylenically unsaturated bonds with 2 to 22 carbon atoms (2-hydroxyethyl methacrylate, vinyl alcohol, etc.) by known methods with isocyanates having 1 to 30 carbon atoms [monoisocyanate compounds (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate and 2,6-dipropylphenyl isocyanate, etc.), aliphatic diisocyanate compounds (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate and 2,4,4-trimethylhexamethylene diisocyanate, etc.), alicyclic diisocyanate compounds (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate and hydrogenated tetramethylxylylene diisocyanate, etc.) and aromatic diisocyanate compounds (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate, etc.) and the like], and monomers obtained by reacting alcohols having 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, erucyl alcohol, etc.) by known methods with isocyanates having ethylenically unsaturated bonds with 2 to 30 carbon atoms [2-isocyanatoethyl (meth)acrylate, 2-(0-[1'-methylpropylidenamino]carboxyamino) ethyl (meth)acrylate, 2-[(3,5-dimethylpyrazolyl)carbonylamino] ethyl (meth)acrylate and 1,1-(bis(meth)acryloyloxymethyl) ethyl isocyanate, etc.] and the like.

Monomers having urea groups: for example, monomers obtained by reacting amines having 3 to 22 carbon atoms [primary amines (normal butylamine, t-butylamine, propylamine, and isopropylamine, etc.), secondary amines (di-normal ethylamine, di-normal propylamine, di-normal butylamine, etc.), anilines, cyclohexylamines and the like] by known methods with isocyanates having ethylenically unsaturated bonds with 2 to 30 carbon atoms and the like.

Monomers having carboxyl groups: for example, methacrylic acid, acrylic acid, 2-carboxy ethyl (meth)acrylate.

Of these, it is preferable to use at least one selected from the group consisting of acrylonitrile and methacrylonitrile. By using these, the melting point of the crystalline resin A is likely to increase and heat-resistant storage stability is likely to improve.

In addition, the vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octylate can also be used by preference as the monomer (b). Vinyl esters are nonconjugated monomers, and have low reactivity with the monomer (a). It is thought that this makes it easier for the monomer units derived from the monomer (a) to aggregate and form bonded states in the crystalline resin A, thereby increasing the crystallinity of the crystalline resin A and making it easier to achieve both low-temperature fixability and heat-resistant storage stability.

In addition to the monomer unit derived from the monomer (a), the crystalline resin A may further comprise a monomer unit derived from a monomer (c) which is different from the monomer (a) (and is more preferably different from the monomers (a) and (b)). If SP(c) denotes the SP value $(J/cm^3)^{0.5}$ of the monomer unit derived from the monomer (c), it is preferable for formula (6) below to be satisfied, and more preferable for formula (6') below to be satisfied.

$$0.20 \leq (SP_c - SP_a) \leq 1.80 \quad (6)$$

$$0.30 \leq (SP_c - SP_a) \leq 1.70 \quad (6')$$

If the crystalline resin A has monomer units derived from the monomer (c) that satisfy formula (6) above in addition to monomer units derived from the monomer (b) that satisfy formula (5) above, crystalline properties derived from domains formed by monomer units derived from the monomer (a) do not decrease, and these domains are more readily dispersed in the toner. As a result, toner strength tends to be uniformly maintained and durability tends to be improved. In addition, formula (3) above is more easily satisfied.

In a case where the monomer (c) comprises two or more types of polymerizable monomer, $SP_c$ denotes the SP values of monomer units derived from each polymerizable monomer, and the value of $SP_c - SP_a$ is determined for monomer units derived from each monomer (c). That is, monomer units derived from the monomer (c) preferably have a $SP_c$ value that satisfies a formula (6) with respect to the $SP_{ii}$ value calculated using the method described above.

The monomer unit derived from the monomer (c) in the crystalline resin A has a content of preferably 2.0 mol % to 35.0 mol %, and more preferably 3.0 mol % to 30.0 mol %, based on the total number of moles of monomer units in the crystalline resin A. If the content of the monomer unit derived from the monomer (c) falls within the range mentioned above, domains of the monomer unit derived from the monomer (a) are more readily dispersed in the toner, and durability tends to be improved.

In addition, in a case where two or more types of monomer units derived from the monomer (c) are present in the crystalline resin A, the proportion of monomer units derived from the monomer (c) indicates the total molar proportion of these.

The monomer unit derived from the monomer (c) in the crystalline resin A has a content of preferably 5.0 mass % to 30.0 mass %, and more preferably 6.0 mass % to 20.0 mass %, based on the total mass of monomer units in the crystalline resin A.

Among monomers listed above as the monomer (b), those that do not satisfy formula (5) above can be used as the monomer (c). In addition, the monomers listed below can also be used.

(Meth)acrylic acid esters such as ethyl (meth)acrylate, n-butyl (meth)acrylate, t-butyl (meth)acrylate and 2-ethylhexyl (meth)acrylate.

Of these, at least one selected from the group consisting of ethyl (meth)acrylate, n-butyl (meth)acrylate and t-butyl (meth)acrylate is preferred, and at least one selected from the group consisting of ethyl methacrylate, n-butyl methacrylate and t-butyl methacrylate is more preferred. Moreover, in cases where these monomers satisfy formula (5) above, these monomers can be used as the monomer (b).

The crystalline resin A may comprise monomer units derived from other monomers that do not satisfy formulae (5) and (6) above as long as the advantageous effect of the present invention is not impaired.

Among monomers listed above as the monomer (b) and the monomer (c), those that do not satisfy formula (5) or formula (6) above can be used as these other monomers. In addition, the monomers listed below can also be used. Styrene, α-methylstyrene and methyl (meth)acrylate. Moreover, in cases where these monomers satisfy formula (5) or formula (6) above, these monomers can be used as the monomer (b) or the monomer (c).

The monomer units derived from these other monomers in the crystalline resin A has a content of preferably 5.0 mol % to 40.0 mol % based on the total number of moles of monomer units in the crystalline resin A.

The monomer units derived from these other monomers in the crystalline resin A has a content of preferably 5.0 mass % to 30.0 mass % based on the total mass of monomer units in the crystalline resin A.

The toner comprises a release agent. The release agent is at least one selected from the group consisting of hydrocarbon-based waxes and ester waxes. By using a hydrocarbon-based wax and/or an ester wax, effective release properties can be ensured.

The hydrocarbon-based wax is not particularly limited, but examples thereof are as follows.

Aliphatic hydrocarbon-based waxes: low molecular weight polyethylene, low molecular weight polypropylene, low molecular weight olefin copolymers, Fischer Tropsch waxes, and waxes obtained by subjecting these to oxidation or acid addition.

The ester wax should have at least one ester bond per molecule, and may be a natural ester wax or a synthetic ester wax.

Ester waxes are not particularly limited, but examples thereof are as follows.

- Esters of a monohydric alcohol and a monocarboxylic acid, such as behenyl behenate, stearyl stearate and palmityl palmitate;
- Esters of a dicarboxylic acid and a monoalcohol, such as dibehenyl sebacate;
- Esters of a dihydric alcohol and a monocarboxylic acid, such as ethylene glycol distearate and hexane diol dibehenate;
- Esters of a trihydric alcohol and a monocarboxylic acid, such as glycerol tribehenate;
- Esters of a tetrahydric alcohol and a monocarboxylic acid, such as pentaerythritol tetrastearate and pentaerythritol tetrapalmitate;
- Esters of a hexahydric alcohol and a monocarboxylic acid, such as dipentaerythritol hexastearate, dipentaerythritol hexapalmitate and dipentaerythritol hexabehenate;
- Esters of a polyfunctional alcohol and a monocarboxylic acid, such as polyglycerol behenate; and natural ester waxes such as carnauba wax and rice wax;

Of these, esters of a hexahydric alcohol and a monocarboxylic acid, such as dipentaerythritol hexastearate, dipentaerythritol hexapalmitate and dipentaerythritol hexabehenate, are preferred.

The release agent may be a hydrocarbon-based wax or an ester wax in isolation, a combination of a hydrocarbon-based wax and an ester wax, or a mixture of two or more types of each, but it is preferable to use a hydrocarbon-based wax in isolation or two or more types thereof. It is more preferable for the release agent to be a hydrocarbon wax.

In the toner, the release agent has a content of preferably from 1.0 mass % to 30.0 mass %, or more preferably from 2.0 mass % to 25.0 mass % in the toner particle. If the content of the release agent in the toner particle is within this range, the release properties are easier to secure during fixing.

The melting point of the release agent is preferably from 60° C. to 120° C. If the melting point of the release agent is within this range, it is more easily melted and exuded on the toner particle surface during fixing, and is more likely to provide release effects. The melting point is more preferably from 70° C. to 100° C.

In addition, the weight average molecular weight (Mw) of tetrahydrofuran (THF)—soluble matter in the crystalline resin A, as measured by gel permeation chromatography (GPC), is preferably from 10,000 to 200,000, and more preferably from 20,000 to 150,000. If this Mw value falls within the range mentioned above, elasticity is likely to be maintained at temperatures close to room temperature.

It is preferable that the crystalline resin A has a content of 50.0 mass % or more in the binder resin. If this content is 50.0 mass % or more, dispersibility of the crystalline resin A in the toner can be maintained at a high level, and therefore toner strength is more uniformly maintained and durability tends to be ensured. This content is more preferably from 80.0 mass % to 100.0 mass %, and it is more preferable for the binder resin to comprise only the crystalline resin A.

Examples of resins that can be used as binder resins other than the crystalline resinA include vinyl resins, polyester resins, polyurethane resins and epoxy resins. Of these, vinyl resins, polyester resins and polyurethane resins are preferred from the standpoint of the electrophotographic properties.

Monomers that can be used for the vinyl resin include the monomers that can be used for the monomer (a), the monomer (b) and monomer (c) as discussed above, as well as the other monomers described above. A combination of two or more kinds may be used as necessary.

The polyester resin can be obtained by a reaction between a bivalent or higher polyvalent carboxylic acid and a polyhydric alcohol.

Examples of the polvalent carboxylic acid include the following compounds: dibasic acids such as succinic acid, adipic acid, sebacic acid, phthalic acid, isophthalic acid, terephthalic acid, malonic acid and dodecenylsuccinic acid, and anhydrides and lower alkyl esters of these, aliphatic unsaturated dicarboxylic acids such as maleic acid, fumaric acid, itaconic acid and citraconic acid, and 1,2,4-benzenetricarboxylic acid and 1,2,5-benzenetricarboxylic, and anhydrides and lower alkyl esters of these. One of these alone or a combination of two or more may be used.

Examples of the polyhydric alcohol include the following compounds: alkylene glycols (ethylene glycol, 1,2-propylene glycol and 1,3-propylene glycol); alkylene ether glycols (polyethylene glycol and polypropylene glycol); alicyclic diols (1,4-cyclohexane dimethanol); bisphenols (bisphenol A); and alkylene oxide (ethylene oxide and propylene oxide) adducts of alicyclic diols. The alkyl parts of alkylene glycols and alkylene ether glycols may be either straight-chain or branched. Other examples include glycerin, trimethylol ethane, trimethylol propane, pentaerythritol and the like. One of these alone or a combination of two or more may be used.

A monovalent acid such as acetic acid or benzoic acid or a monohydric alcohol such as cyclohexanol or benzyl alcohol may also be used as necessary to adjust the acid value or hydroxy value.

The method for manufacturing the polyester resin is not particularly limited, and ester exchange methods or direct polycondensation methods may be used either alone or in combination.

The polyurethane resin is discussed next. The polyurethane resin is a reaction product of a diol and a substance containing a diisocyanate group, and resins having various functions can be obtained by adjusting the diol and diisocyanate.

Examples of the diisocyanate component include the following: aromatic diisocyanates that contains from 6 to 20 carbon atoms (here and below, excluding carbon atoms in NCO groups), aliphatic diisocyanates that contains from 2 to 18 carbon atoms, alicyclic diisocyanates that contains from 4 to 15 carbon atoms, and modified forms of these diisocyanates (modified forms containing urethane groups, carbodiimide groups, allophanate groups, urea groups, biuret groups, uretdione groups, urethimine groups, isocyanurato groups or oxazolidone groups (hereunder also called "modified isocyanates")), and mixtures of two or more of these.

Examples of aromatic diisocyanates include m- and/or p-xylylene diisocyanate (XDI) and α, α, α', α'-tetramethylxylylene diisocyanate.

Examples of aliphatic diisocyanates include ethylene diisocyanate, tetramethylene diisocyanate, hexamethylene diisocyanate (HDI) and dodecamethylene diisocyanate.

Examples of alicyclic diisocyanates include isophorone diisocyanate (IPDI), dicyclohexylmethane-4,4'-diisocyanate, cyclohexylene diisocyanate and methylcyclohexylene diisocyanate.

Of these, an aromatic diisocyanate that contains from 6 to 15 carbon atoms, an aliphatic diisocyanate that contains from 4 to 12 carbon atoms and an alicyclic diisocyanate that contains from 4 to 15 carbon atoms is preferred, and XDI, IPDI and HDI are especially preferred.

A trifunctional or higher isocyanate compound may also be used in addition to the diisocyanate component.

Diol components that can be used in the polyurethane resin include components similar to the bivalent alcohols that can be used in the polyester resin described above.

The toner particle may contain a core having the binder resin and the release agent, and a shell that coats the core.

The resin that forms the shell is not particularly limited, but for example, resins listed as binder resins able to be used other than the crystalline resin A can be used as the resin. Of these, a vinyl resin or polyester resin is preferred from the perspective of charge stability. An amorphous polyester resin is more preferred. The shell does not necessarily need to coat the whole of the core, and a part of the core may be exposed.

The toner may also contain a colorant. Examples of colorants include known organic pigments, organic dyes, inorganic pigments, and carbon black and magnetic particles as black colorants. Other colorants conventionally used in toners may also be used.

Examples of yellow colorants include condensed azo compounds, isoindolinone compounds, anthraquinone compounds, azo metal complexes, methine compounds and allylamide compounds. Specifically, C.I. pigment yellow 12, 13, 14, 15, 17, 62, 74, 83, 93, 94, 95, 109, 110, 111, 128, 129, 147, 155, 168 and 180 can be used by preference.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Specifically, C.I. pigment red 2, 3, 5, 6, 7, 23, 48:2, 48:3, 48:4, 57:1, 81:1, 122, 144, 146, 166, 169, 177, 184, 185, 202, 206, 220, 221 and 254 can be used by preference.

Examples of cyan colorants include copper phthalocyanine compounds and their derivatives, anthraquinone compounds, and basic dye lake compounds. Specifically, C.I. pigment blue 1, 7, 15, 15:1, 15:2, 15:3, 15:4, 60, 62 and 66 can be used by preference.

The colorants are selected based on considerations of hue angle, chroma, lightness, weather resistance, OHP transparency, and dispersibility in the toner.

The content of the colorant is preferably from 1.0 to 20.0 mass parts per 100.0 mass parts of the binder resin. When a magnetic particle is used as the colorant, the content thereof is preferably from 40.0 to 150.0 mass parts per 100.0 mass parts of the binder resin.

A charge control agent may be included in the toner particle as necessary. A charge control agent may also be added externally to the toner particle. By compound a charge control agent, it is possible to stabilize the charging properties and control the triboelectric charge quantity at a level appropriate to the developing system.

A known charge control agent may be used, and a charge control agent capable of providing a rapid charging speed and stably maintaining a uniform charge quantity is especially desirable.

Organic metal compounds and chelate compounds are effective as charge control agents for giving the toner a negative charge, and examples include monoazo metal compounds, acetylacetone metal compounds, and metal compounds using aromatic oxycarboxylic acids, aromatic dicarboxylic acids, oxycarboxylic acids and dicarboxylic acids.

Examples of charge control agents for giving the toner a positive charge include nigrosin, quaternary ammonium salts, metal salts of higher fatty acids, diorganotin borates, guanidine compounds and imidazole compounds.

The content of the charge control agent is preferably from 0.01 to 20.0 mass parts, or more preferably from 0.5 to 10.0 mass parts per 100.0 mass parts of the toner particle.

The toner particle may be used as-is as a toner, but a toner may, if necessary, also be formed by mixing an external additive or the like so as to attach the external additive to the surface of the toner particle.

Examples of the external additive include inorganic fine particles selected from the group consisting of silica fine particles, alumina fine particles and titania fine particles, and composite oxides of these. Examples of composite oxides include silica-aluminum fine particles and strontium titanate fine particles.

The content of the external additive is preferably from 0.01 parts by mass to 8.0 parts by mass, and more preferably from 0.1 parts by mass to 4.0 parts by mass, relative to 100 parts by mass of the toner particle.

Within the scope of the present configuration, the toner particle may be manufactured by any known conventional method such as suspension polymerization, emulsion polymerization, dissolution suspension or pulverization, but is preferably manufactured by a suspension polymerization method.

For example, the polymerizable monomers for producing a binder resin containing the crystalline resin A and release agent can be mixed together with other additives such as colorants as necessary to obtain a polymerizable monomer composition. This polymerizable monomer composition is then added to a continuous phase (such as an aqueous solvent, in which a dispersion stabilizer may be included as necessary). Particles of the polymerizable monomer composition are then formed in the continuous phase (aqueous solvent), and the polymerizable monomers contained in those particles are polymerized. A toner particle can be obtained in this way.

That is, the toner particle is preferably obtained by means of suspension polymerization.

In addition, the toner production method preferably includes:

- a step for obtaining a polymerizable monomer composition comprising a monomer (a) and a release agent;
- a step for dispersing the polymerizable monomer composition in an aqueous medium to form particles of the polymerizable monomer composition; and
- a step for polymerizing the polymerizable monomer comprised in the particles of the polymerizable monomer composition to obtain toner particles.

In addition, the toner production method preferably includes a step for subjecting the obtained toner particles to the heat treatment described above.

Methods for calculating and measuring the various physical properties of the toner and toner materials are given below.

<Methods for Measuring Tp, ΔH and $\Delta H_{Tp-3}$>

Tp, ΔH and $\Delta H_{Tp-3}$ values of the toner are measured using a DSC Q2000 (produced by TA Instruments) under the following conditions.

Temperature Increase Rate: 10° C./Min

Measurement start temperature: 20° C.

Measurement end temperature: 180° C.

Temperature calibration of the detector in the apparatus is performed using the melting points of indium and zinc, and heat amount calibration is performed using the heat of fusion of indium.

Specifically, approximately 5 mg of a sample is weighed out, placed in an aluminum pan, and subjected to differential scanning calorimetric measurements. An empty silver pan is used as a reference. The temperature is increased to 180° C. at a rate of 10° C./min. Next, peak temperatures and endothermic quantities are calculated from each peak.

The toner is used as a sample, but in a case where an endothermic peak derived from the crystalline resin A does not overlap an endothermic peak derived from the release agent or the like, this is used as-is as an endothermic peak derived from the crystalline resin A. However, in a case where an endothermic peak of the release agent overlaps an endothermic peak derived from the crystalline resin A, it is necessary to subtract the endothermic quantity derived from the release agent.

For example, it is possible to subtract an endothermic quantity derived from the release agent and obtain an endothermic peak derived from the crystalline resin A using the following method.

First, DSC measurements are separately carried out on the release agent in isolation so as to determine the endothermic characteristics of the release agent. Next, the content of the release agent in the toner is determined. The content of the release agent in the toner can be measured using a well-known structural analysis method. Next, an endothermic quantity attributable to the release agent is calculated from the content of the release agent in the toner, and this quantity should be subtracted from a peak derived from the crystalline resin A.

In a case where the release agent is readily compatible with the resin component, it is necessary to multiply the content of the release agent by the degree of compatibility thereof, calculate the endothermic quantity attributable to the release agent, and then subtract this endothermic quantity. The degree of compatibility is calculated from a value obtained by dividing the endothermic quantity, which is determined for a material obtained by melting and mixing the release agent and a molten mixture of resin components in the same ratio as the content of the release agent, by the theoretical endothermic quantity, which is calculated from the endothermic quantity of the molten mixture and the endothermic quantity of the release agent in isolation, which are determined in advance.

The endothermic quantity (ΔH) is calculated by using DSC analysis software to calculate the endothermic quantity from a temperature that is 20.0° C. lower than Tp to a temperature that is 10.0° C. higher than Tp. In addition, $\Delta H_{Tp-3}$ is calculated by using DSC analysis software to calculate the endothermic quantity from a temperature that is 20.0° C. lower than Tp to a temperature that is 3.0° C. lower than Tp.

<Method for Measuring Content of Monomer Units Derived from Each Polymerizable Monomer in Crystalline Resin A>

The contents of the monomer units derived from each polymerizable monomer in the crystalline resin A are measured by $^1$H-NMR under the following conditions.

Measurement unit: FT NMR unit JNM-EX400 (JEOL Ltd.)

Measurement frequency: 400 MHz

Pulse condition: 5.0 μs

Frequency range: 10,500 Hz

Number of integrations: 64

Measurement temperature: 30° C.

Sample: Prepared by placing 50 mg of the measurement sample in a sample tube with an inner diameter of 5 mm, adding deuterated chloroform ($CDCl_3$) as a solvent, and dissolving this in a thermostatic tank at 40° C.

Of the peaks attributable to constituent elements of monomer units derived from the monomer (a) in the resulting 41-NMR chart, a peak independent of peaks attributable to constituent elements of otherwise-derived monomer units is selected, and the integrated value $S_1$ of this peak is calculated.

Similarly, a peak independent of peaks attributable to constituent elements of otherwise-derived monomer units is selected from the peaks attributable to constituent elements of monomer units derived from the monomer (b), and the integrated value $S_2$ of this peak is calculated.

When a monomer (c) is used, moreover, a peak independent of peaks attributable to constituent elements of otherwise-derived monomer units is selected from the peaks attributable to constituent elements of monomer units derived from the monomer (c), and the integrated value $S_3$ of this peak is calculated. Similar calculations are carried out ($S_4$) in a case where the other monomer is used.

The content of the monomer unit derived from the monomer (a) is determined as follows using the integrated values $S_1$, $S_2$, $S_3$, and $S_4$. $n_1$, $n_2$, $n_3$, and $n_4$ are the numbers of hydrogen atoms in the constituent elements to which the observed peaks are attributed for each segment.

$$\text{Ratio (mol \%) of monomer units derived from monomer } (a)=\{(S_1/n_1)/((S_1/n_1)+(S_2/n_2)+(S_3/n_3)+(S_4/n_4)\}\times 100$$

The ratios of monomer units derived from the monomers (b), (c) and the other monomer are determined similarly as follows.

$$\text{Ratio (mol \%) of monomer units derived from monomer } (b)=\{(S_2/n_2)/((S_1/n_1)+(S_2/n_2)+(S_3/n_3)+(S_4/n_4)\}\times 100$$

$$\text{Ratio (mol \%) of monomer units derived from monomer } (c)=\{(S_3/n_3)/((S_1/n_1)+(S_2/n_2)+(S_3/n_3)+(S_4/n_4)\}\times 100$$

$$\text{Ratio (mol \%) of monomer units derived from the other monomer}=\{(S_4/n_4)/((S_1/n_1)+(S_2/n_2)+(S_3/n_3)+(S_4/n_4)\}\times 100$$

When a polymerizable monomer containing no hydrogen atoms is used for a constituent element other than a vinyl group in the crystalline resin A, measurement is performed in single pulse mode by $^{13}$C-NMR using $^{13}$C as the measured nucleus, and the ratio is calculated in the same way as by $^1$H-NMR.

When the toner is manufactured by suspension polymerization method, independent peaks may not be observed because the peaks of the release agent or a resin for shell overlap. Therefore, in some cases it may not be possible to calculate the contents of the monomer units derived from the polymerizable monomers in the crystalline resin A. In such cases, a crystalline resin A' can be manufactured and analyzed as the crystalline resin A by performing similar suspension polymerization without using a release agent or other resin.

Method for Calculating SP Value $SP_a$, $SP_b$ and $SP_c$ are determined as follows following the calculation methods proposed by Fedors.

The evaporation energy (Δei) (cal/mol) and molar volume (Δvi) ($cm^3$/mol) are determined from the tables described in "Polym. Eng. Sci., 14(2), 147-154 (1974)" for the atoms or atomic groups in the molecular structures in which a double bond in each polymerizable monomer has been cleaved by means of polymerization, and $(4.184\times\Sigma\Delta ei/\Sigma\Delta vi)^{0.5}$ is given as the SP value $(J/cm^3)^{0.5}$.

<Method for Measuring Glass Transition Temperature Tg>

The glass transition temperature Tg is measured in accordance with ASTM D3418-82 using a "Q2000" differential scanning calorimeter (produced by TA Instruments). Temperature calibration of the detector in the apparatus is performed using the melting points of indium and zinc, and heat amount calibration is performed using the heat of fusion of indium.

Specifically, approximately 2 mg of a sample is precisely weighed out and placed in an aluminum pan, an empty aluminum pan is used as a reference, and measurements are carried out within a measurement temperature range of from −10° C. to 200° C., at a ramp rate of 10° C./min. Moreover, when carrying out measurements, the temperature is once increased to 200° C., then lowered to −10° C., and then increased again. A change in specific heat is determined within the temperature range of from 30° C. to 100° C. in this second temperature increase step. Here, the glass transition temperature Tg is deemed to be the point at which the differential thermal analysis curve intersects with the line at an intermediate point on the baseline before and after a change in specific heat occurs.

<Method for Measuring Molecular Weight of Resin Such as Crystalline Resin A>

The molecular weight (weight average molecular weight Mw and number average molecular weight Mn) of THF-soluble matter in the resin such as a crystalline resin A is measured by means of gel permeation chromatography (GPC), in the manner described below.

First, the sample is dissolved in tetrahydrofuran (THF) at room temperature over the course of 24 hours. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

Device: HLC8120 GPC (detector: RI) (Tosoh Corp.)

Columns: Shodex KF-801, 802, 803, 804, 805, 806, 807 (total 7) (Showa Denko)

Eluent: Tetrahydrofuran (THF)

Flow rate: 1.0 mL/min

Oven temperature: 40.0° C.

Sample injection volume: 0.10 mL

A molecular weight calibration curve prepared using standard polystyrene resin (such as TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

EXAMPLES

The present invention is explained in detail below using examples, but the invention is not limited by these examples. Unless otherwise specified, parts in the formulations below are based on mass.

<Preparation of Monomer Having Urea Group>

50.0 parts of dibutylamine were loaded into a reactor, after which 5.0 parts of KarenzMOl (2-isocyanatoethyl methacrylate, Showa Denko) were added dropwise at room temperature under stirring. After completion of dropping, this was stirred for 2 hours. The unreacted dibutylamine was then removed in an evaporator to prepare a monomer having a urea group.

<Preparation of Crystalline Resin A1>

The following materials were loaded in a nitrogen atmosphere into a reactor equipped with a reflux condenser, a stirrer, a thermometer and a nitrogen introduction pipe.

| | |
|---|---|
| Toluene | 100.0 parts |
| Monomer composition | 100.0 parts |
| (The monomer composition is a mixture of the following behenyl acrylate, methacrylonitrile, ethyl methacrylate and styrene in the following proportions.) | |
| (Behenyl acrylate (monomer (a)): 50.0 parts) | |
| (Methacrylonitrile (monomer (b)): 30.0 parts) | |
| (Ethyl methacrylate (monomer (c)): 13.0 parts) | |
| (Styrene (other monomer): 7.0 parts) | |
| Polymerization initiator: t-butyl peroxypivalate (Perbutyl PV, NOF Corp.) | 0.5 parts |

The reactor contents were stirred at 200 rpm, heated to 70° C., and polymerized for 12 hours to obtain a solution of the polymers of the monomer composition dissolved in toluene. Next, this solution was cooled to 25° C., and added with stirring to 1,000.0 parts of methanol to precipitate a methanol-insoluble component. The resulting methanol-insoluble component was filtered out, further washed with methanol, and vacuum dried for 24 hours at 40° C. to obtain a crystalline resin A1.

<Preparation of Crystalline Resins A2 and A3>

Crystalline resins A2 and A3 were prepared in the same way as crystalline resin A1, except that added quantities in the monomer composition were changed as shown in Table 1.

TABLE 1

| | Monomer (a) | | Monomer (b) | | Monomer (c) | | the other monomer | |
|---|---|---|---|---|---|---|---|---|
| Crystalline resin A | Type | Parts | Type | Parts | Type | Parts | Type | Parts |
| Crystalline resin A1 | behenyl acrylate | 50.0 | Methacrylonitrile | 30.0 | Ethyl methacrylate | 13.0 | Styrene | 7.0 |
| Crystalline resin A2 | behenyl acrylate | 85.0 | Methacrylonitrile | 10.0 | Ethyl methacrylate | 5.0 | — | — |
| Crystalline resin A3 | behenyl acrylate | 88.0 | Methacrylonitrile | 7.0 | Ethyl methacrylate | 5.0 | — | — |

<Production Example of Shell Resin>

The materials listed below were added to an autoclave equipped with a depressurization device, a water separation device, a nitrogen gas inlet device, a temperature measurement device and a stirrer.

Terephthalic acid: 32.3 parts (50.0 mol %)

Adduct of 2 moles of propylene oxide to bisphenol A: 67.7 parts (50.0 mol %)

Titanium potassium oxalate (catalyst): 0.02 parts

Next, a reaction was carried out in a nitrogen atmosphere at normal pressure and a temperature of 220° C. until a prescribed molecular weight was attained. A shell resin, which was an amorphous polyester resin, was obtained by cooling and then pulverizing.

The obtained shell resin had a weight average molecular weight (Mw) of 20,000 and a glass transition temperature (Tg) of 70° C.

<Preparation of Amorphous Resin>

Nitrogen was introduced into a heat-dried two-necked flask as the following raw materials were added.

| | |
|---|---|
| Polyoxypropylene (2.2)-2,2-bis(4-hydroxyphenyl) propane | 30.0 parts |
| Polyoxyethylene (2.2)-2,2-bis(4-hydroxyphenyl) propane | 33.0 parts |
| Terephthalic acid | 21.0 parts |
| Dodecenylsuccinic acid | 15.0 parts |
| Dibutyl tin oxide | 0.1 part |

The system was purged with nitrogen by a depressurization operation, and stirred for 5 hours at 215° C. Stirring was then continued as the temperature was gradually raised to 230° C. under reduced pressure, and maintained for a further 2 hours. Once a viscous state was reached, this was air cooled to stop the reaction and synthesize an amorphous polyester as an amorphous resin. The amorphous resin had an Mn of 5,200, a Mw of 23,000 and a Tg of 55° C.

Example 1

[Production of Toner by Suspension Polymerization Method]

(Production of Toner Particle 1)

| | |
|---|---|
| Methacrylonitrile (monomer (b)): | 30.0 parts |
| Ethyl methacrylate (monomer (c)): | 13.0 parts |
| Styrene (the other monomer): | 7.0 parts |
| Colorant: Pigment Blue 15:3: | 6.5 parts |

A mixture consisting of the above materials was prepared, loaded into an attritor (Nippon Coke & Engineering), and dispersed for 2 hours at 200 rpm with zirconia beads 5 mm in diameter to obtain a raw material dispersion.

Meanwhile, 735.0 parts of ion-exchanged water and 16.0 parts of trisodium phosphate (12-hydrate) were added to a vessel provided with a Homomixer high-speed agitator (Primix) and a thermometer, and stirred at 12,000 rpm as the temperature was raised to 60° C. A calcium chloride aqueous solution of 9.0 parts of calcium chloride (2-hydrate) dissolved in 65.0 parts of ion-exchanged water was added, and stirred for 30 minutes at 12,000 rpm with the temperature maintained at 60° C. The pH of the mixture was adjusted to 6.0 through addition of 10% hydrochloric acid to obtain an aqueous medium in which a hydroxyapatite-containing inorganic dispersion stabilizer was dispersed in water.

The raw material-dispersed solution was then transferred to a vessel equipped with a stirrer and a thermometer, and the temperature was increased to 60° C. while stirring at 100 rpm. Next,

| | |
|---|---|
| Behenyl acrylate (monomer (a)): | 50.0 parts |
| Shell resin: | 5.0 parts |
| Release agent 1: | 10.0 parts |

(Release agent 1: HNP51 produced by Nippon Seiro Co., Ltd., melting point: 77° C.)

were added, and after stirring for 30 minutes at 100 rpm while maintaining a temperature of 60° C., 5.0 parts of t-butyl peroxypivalate (Perbutyl PV produced by NOF Corp.) was then added as a polymerization initiator, stirring was carried out for a further 1 minute, and the solution was then introduced into an aqueous medium being stirred at 12,000 rpm using the high-speed agitator. The temperature was then maintained at 60° C. as stirring was continued for 20 minutes at 12,000 rpm with the high-speed agitator to obtain a granulating liquid.

This granulating liquid was transferred to a reactor equipped with a reflux condenser, a stirrer, a thermometer and a nitrogen introduction tube, and stirred at 150 rpm in a nitrogen atmosphere as the temperature was raised to 70° C. The polymerization reaction was carried out at 150 rpm for 12 hours while maintaining 70° C. to obtain toner particle dispersion.

The obtained toner particle dispersion was cooled to 45° C. while being stirred at 150 rpm and then heat treated for 5 hours while maintaining a temperature of 45° C. Next, dilute hydrochloric acid was added under stirring until the pH reached 1.5, thereby dissolving the dispersion stabilizer. Solid content was filtered off, thoroughly washed with ion exchanged water and then vacuum dried for 24 hours at 30° C., thereby obtaining toner particle 1.

In addition, a crystalline resin 1' was obtained by carrying out production in the same way as in the production example of toner particle 1 above, except that the colorant, the shell resin and release agent 1 were omitted. When subjected to NMR analysis, the crystalline resin 1' contained 17.3 mol % of monomer units derived from behenyl acrylate, 58.9 mol % of monomer units derived from methacrylonitrile, 15.0 mol % of monomer units derived from ethyl methacrylate and 8.8 mol % of monomer units derived from styrene. Physical property values of the crystalline resin 1' were taken to be physical property values of the crystalline resin A used in toner particle 1.

(Preparation of Toner 1)

Toner 1 was obtained by adding 2.0 parts of silica fine particles (hydrophobically treated with hexamethyldisilazane; number average particle diameter of primary particles: 10 nm, BET specific surface area 170 $m^2/g$) as an external additive to 100.0 parts of toner particle 1 above, and mixing for 15 minutes at 3,000 rpm using a Henschel mixer (produced by Nippon Coke and Engineering Co., Ltd.). Physical properties of the obtained toner 1 are shown in Tables 3-1 and 3-2, and evaluation results are shown in Table 7.

TABLE 2

| Example No. | Monomer (a) Type | Parts | Monomer (b) Type | Parts | Monomer (c) Type | Parts |
|---|---|---|---|---|---|---|
| 1 | Behenyl acrylate | 50.0 | Methacrylonitrile | 30.0 | Ethyl methacrylate | 13.0 |
| 2 | Behenyl acrylate | 30.0 | Methacrylonitrile | 50.0 | Ethyl methacrylate | 10.0 |
| 4 | Behenyl acrylate | 65.0 | Methacrylonitrile | 25.0 | Ethyl methacrylate | 5.0 |
| 5 | Behenyl acrylate | 50.0 | Methacrylonitrile | 30.0 | Ethyl methacrylate | 13.0 |
| 6 | Behenyl acrylate | 50.0 | Methacrylonitrile | 30.0 | Ethyl methacrylate | 13.0 |
| 7 | Behenyl acrylate | 50.0 | Methacrylonitrile | 30.0 | Ethyl methacrylate | 13.0 |
| 8 | Stearyl acrylate | 50.0 | Methacrylonitrile | 30.0 | Ethyl methacrylate<br>Styrene | 13.0<br>7.0 |
| 9 | Myricyl acrylate | 50.0 | Methacrylonitrile | 10.0 | Ethyl methacrylate | 10.0 |
| 10 | Behenyl acrylate | 50.0 | Methacrylonitrile | 30.0 | Ethyl methacrylate | 13.0 |
| 11 | Behenyl acrylate | 50.0 | Methacrylonitrile | 30.0 | Ethyl methacrylate | 13.0 |
| 12 | Behenyl acrylate | 50.0 | Methacrylonitrile | 30.0 | Ethyl methacrylate | 13.0 |
| 16 | Behenyl acrylate | 50.0 | Methacrylonitrile | 10.0 | Ethyl methacrylate | 15.0 |
| 17 | Behenyl acrylate | 50.0 | Methacrylonitrile | 8.0 | Ethyl methacrylate | 5.0 |
| 18 | Behenyl acrylate | 50.0 | Methacrylonitrile | 30.0 | Ethyl methacrylate | 2.0 |
| 19 | Behenyl acrylate | 50.0 | Acrylonitrile | 30.0 | Ethyl methacrylate | 13.0 |
| 20 | Behenyl acrylate | 50.0 | Methacrylonitrile | 30.0 | n-butyl methacrylate | 13.0 |
| 21 | Behenyl acrylate | 50.0 | Methacrylonitrile | 30.0 | t-butyl methacrylate | 13.0 |
| 22 | Behenyl acrylate | 50.0 | Methacrylonitrile | 30.0 | n-butyl acrylate | 13.0 |
| 23 | Behenyl acrylate | 50.0 | Methacrylonitrile | 30.0 | — | — |
| 24 | Behenyl acrylate | 50.0 | — | — | Ethyl methacrylate | 13.0 |
| 25 | Behenyl acrylate | 50.0 | Methacrylonitrile | 30.0 | Ethyl methacrylate | 3.0 |
| 26 | Behenyl acrylate | 50.0 | Methacrylonitrile | 20.0 | Ethyl methacrylate | 23.0 |
| 27 | Behenyl acrylate | 50.0 | Methacrylonitrile | 20.0 | Ethyl methacrylate | 25.0 |
| 28 | Behenyl acrylate | 50.0 | Methyl acrylate | 20.0 | Ethyl methacrylate | 25.0 |
| Comparative Example 1 | Behenyl acrylate | 66.6 | Acrylic acid | 4.8 | — | — |
| Comparative Example 2 | Behenyl acrylate | 50.0 | Acrylonitrile<br>Urea group-containing monomer | 25.0<br>3.5 | — | — |
| Comparative Example 3 | Hexadecyl acrylate | 50.0 | Methacrylonitrile | 30.0 | Ethyl methacrylate<br>Styrene | 13.0<br>7.0 |
| Comparative Example 4 | Myricyl acrylate | 50.0 | Methacrylonitrile | 30.0 | Ethyl methacrylate | 13.0 |
| Comparative Example 5 | Behenyl acrylate | 28.0 | Methacrylonitrile | 52.0 | Ethyl methacrylate | 10.0 |
| Comparative Example 7 | Behenyl acrylate | 71.0 | Methacrylonitrile | 19.0 | Ethyl methacrylate | 5.0 |
| Comparative Example 8 | Behenyl acrylate | 50.0 | Methacrylonitrile | 30.0 | Ethyl methacrylate | 13.0 |

| Example No. | the other monomer Type | Parts | Shell resin Parts | Release agent Type (Release agent No.) | Release agent Parts | Heat treatment Temperature (° C.) | Heat treatment Duration (h) |
|---|---|---|---|---|---|---|---|
| 1 | Styrene | 7.0 | 5.0 | 1 | 10.0 | 45.0 | 5.0 |
| 2 | Styrene | 10.0 | 5.0 | 1 | 10.0 | 40.0 | 5.0 |
| 4 | Styrene | 5.0 | 5.0 | 1 | 10.0 | 45.0 | 5.0 |
| 5 | Styrene | 7.0 | 5.0 | 1 | 10.0 | 45.0 | 2.0 |

TABLE 2-continued

| | | | | | | | |
|---|---|---|---|---|---|---|---|
| 6 | Styrene | 7.0 | 5.0 | 1 | 10.0 | 45.0 | 1.0 |
| 7 | Styrene | 7.0 | 5.0 | 1 | 10.0 | 40.0 | 2.0 |
| 8 | — | — | 5.0 | 1 | 10.0 | 40.0 | 5.0 |
| 9 | Styrene | 30.0 | 5.0 | 1 | 10.0 | 55.0 | 5.0 |
| 10 | Styrene | 7.0 | 5.0 | 3 | 10.0 | 45.0 | 5.0 |
| 11 | Styrene | 7.0 | 5.0 | 2 | 10.0 | 45.0 | 5.0 |
| 12 | Styrene | 7.0 | 5.0 | 4 | 10.0 | 45.0 | 5.0 |
| 16 | Styrene | 25.0 | 5.0 | 1 | 10.0 | 45.0 | 5.0 |
| 17 | Styrene | 27.0 | 5.0 | 1 | 10.0 | 45.0 | 5.0 |
| 18 | Styrene | 18.0 | 5.0 | 1 | 10.0 | 45.0 | 5.0 |
| 19 | Styrene | 7.0 | 5.0 | 1 | 10.0 | 45.0 | 5.0 |
| 20 | Styrene | 7.0 | 5.0 | 1 | 10.0 | 45.0 | 5.0 |
| 21 | Styrene | 7.0 | 5.0 | 1 | 10.0 | 45.0 | 5.0 |
| 22 | Styrene | 7.0 | 5.0 | 1 | 10.0 | 45.0 | 5.0 |
| 23 | Styrene | 20.0 | 5.0 | 1 | 10.0 | 45.0 | 5.0 |
| 24 | Styrene<br>Methyl methacrylate | 7.0<br>30.0 | 5.0 | 1 | 10.0 | 40.0 | 5.0 |
| 25 | Styrene | 17.0 | 5.0 | 1 | 10.0 | 45.0 | 5.0 |
| 26 | Styrene | 7.0 | 5.0 | 1 | 10.0 | 45.0 | 5.0 |
| 27 | Styrene | 5.0 | 5.0 | 1 | 10.0 | 45.0 | 5.0 |
| 28 | Styrene | 5.0 | 5.0 | 1 | 10.0 | 40.0 | 5.0 |
| Comparative Example 1 | Methyl methacrylate | 28.6 | 5.0 | 5 | 10.0 | — | — |
| Comparative Example 2 | Styrene | 25.0 | 5.0 | 6 | 10.0 | — | — |
| Comparative Example 3 | — | — | 5.0 | 1 | 10.0 | 30.0 | 5.0 |
| Comparative Example 4 | Styrene | 7.0 | 5.0 | 1 | 10.0 | 55.0 | 5.0 |
| Comparative Example 5 | Styrene | 10.0 | 5.0 | 1 | 10.0 | 40.0 | 5.0 |
| Comparative Example 7 | Styrene | 5.0 | 5.0 | 1 | 10.0 | 45.0 | 5.0 |
| Comparative Example 8 | Styrene | 7.0 | 5.0 | 1 | 10.0 | — | — |

TABLE 3-1

| | | | Crystalline resin A | | | |
|---|---|---|---|---|---|---|
| Example | Toner | Production | Monomer (a) | | Monomer (b) | |
| No. | No. | method | Type | mol % | Type | mol % |
| 1 | 1 | Suspension polymerization method | Behenyl acrylate | 17.3 | Methacrylonitrile | 58.9 |
| 2 | 2 | Suspension polymerization method | Behenyl acrylate | 7.8 | Methacrylonitrile | 74.0 |
| 3 | 3 | Emulsion aggregation method | Behenyl acrylate | 17.3 | Methacrylonitrile | 58.9 |
| 4 | 4 | Suspension polymerization method | Behenyl acrylate | 26.9 | Methacrylonitrile | 58.7 |
| 5 | 5 | Suspension polymerization method | Behenyl acrylate | 17.3 | Methacrylonitrile | 58.9 |
| 6 | 6 | Suspension polymerization method | Behenyl acrylate | 17.3 | Methacrylonitrile | 58.9 |
| 7 | 7 | Suspension polymerization method | Behenyl acrylate | 17.3 | Methacrylonitrile | 58.9 |
| 8 | 8 | Suspension polymerization method | Stearyl acrylate | 19.7 | Methacrylonitrile | 57.2 |
| 9 | 9 | Suspension polymerization method | Myricyl acrylate | 16.2 | Methacrylonitrile | 23.8 |
| 10 | 10 | Suspension polymerization method | Behenyl acrylate | 17.3 | Methacrylonitrile | 58.9 |
| 11 | 11 | Suspension polymerization method | Behenyl acrylate | 17.3 | Methacrylonitrile | 58.9 |
| 12 | 12 | Suspension polymerization method | Behenyl acrylate | 17.3 | Methacrylonitrile | 58.9 |
| 13 | 13 | Emulsion aggregation method | Behenyl acrylate | 58.4 | Methacrylonitrile | 30.4 |
| 14 | 14 | Emulsion aggregation method | Behenyl acrylate | 61.0 | Methacrylonitrile | 27.5 |
| 15 | 15 | Emulsion aggregation method | Behenyl acrylate | 61.0 | Methacrylonitrile | 27.5 |
| 16 | 16 | Suspension polymerization method | Behenyl acrylate | 20.1 | Methacrylonitrile | 22.9 |

TABLE 3-1-continued

| | | | | | | |
|---|---|---|---|---|---|---|
| 17 | 17 | Suspension polymerization method | Behenyl acrylate | 20.5 | Methacrylonitrile | 19.1 |
| 18 | 18 | Suspension polymerization method | Behenyl acrylate | 17.1 | Methacrylonitrile | 58.1 |
| 19 | 19 | Suspension polymerization method | Behenyl acrylate | 15.0 | Acrylonitrile | 64.3 |
| 20 | 20 | Suspension polymerization method | Behenyl acrylate | 17.8 | Methacrylonitrile | 60.7 |
| 21 | 21 | Suspension polymerization method | Behenyl acrylate | 17.8 | Methacrylonitrile | 60.7 |
| 22 | 22 | Suspension polymerization method | Behenyl acrylate | 17.6 | Methacrylonitrile | 59.8 |
| 23 | 23 | Suspension polymerization method | Behenyl acrylate | 17.1 | Methacrylonitrile | 58.0 |
| 24 | 24 | Suspension polymerization method | Behenyl acrylate | 21.5 | — | — |
| 25 | 25 | Suspension polymerization method | Behenyl acrylate | 17.1 | Methacrylonitrile | 58.2 |
| 26 | 26 | Suspension polymerization method | Behenyl acrylate | 18.8 | Methacrylonitrile | 42.7 |
| 27 | 27 | Suspension polymerization method | Behenyl acrylate | 18.9 | Methacrylonitrile | 42.8 |
| 28 | 28 | Suspension polymerization method | Behenyl acrylate | 19.9 | Methyl acrylate | 52.7 |
| Comparative Example 1 | Comparative Toner 1 | Suspension polymerization method | Behenyl acrylate | 33.2 | Acrylic acid | 12.6 |
| Comparative Example 2 | Comparative Toner 2 | Suspension polymerization method | Behenyl acrylate | 15.5 | Acrylonitrile<br>Urea group-containing monomer | 55.4<br>0.8 |
| Comparative Example 3 | Comparative Toner 3 | Suspension polymerization method | Hexadecyl acrylate | 21.2 | Methacrylonitrile | 56.1 |
| Comparative Example 4 | Comparative Toner 4 | Suspension polymerization method | Myricyl acrylate | 13.9 | Methacrylonitrile | 61.3 |
| Comparative Example 5 | Comparative Toner 5 | Suspension polymerization method | Behenyl acrylate | 7.1 | Methacrylonitrile | 75.1 |
| Comparative Example 6 | Comparative Toner 6 | Emulsion aggregation method | Behenyl acrylate | 17.3 | Methacrylonitrile | 58.9 |
| Comparative Example 7 | Comparative Toner 7 | Suspension polymerization method | Behenyl acrylate | 33.2 | Methacrylonitrile | 50.4 |
| Comparative Example 8 | Comparative Toner 8 | Suspension polymerization method | Behenyl acrylate | 17.3 | Methacrylonitrile | 58.9 |

| Example | Crystalline resin A | | | | | |
|---|---|---|---|---|---|---|
| | Monomer (c) | | the other monomer | | SPb- | SPc- |
| No. | Type | mol % | Type | mol % | SPa | SPa |
| 1 | Ethyl methacrylate | 15.0 | Styrene | 8.8 | 7.71 | 1.64 |
| 2 | Ethyl methacrylate | 8.7 | Styrene | 9.5 | 7.71 | 1.64 |
| 3 | Ethyl methacrylate | 15.0 | Styrene | 8.8 | 7.71 | 1.64 |
| 4 | Ethyl methacrylate | 6.9 | Styrene | 7.5 | 7.71 | 1.64 |
| 5 | Ethyl methacrylate | 15.0 | Styrene | 8.8 | 7.71 | 1.64 |
| 6 | Ethyl methacrylate | 15.0 | Styrene | 8.8 | 7.71 | 1.64 |
| 7 | Ethyl methacrylate | 15.0 | Styrene | 8.8 | 7.71 | 1.64 |
| 8 | Ethyl methacrylate<br>Styrene | 14.5<br>8.6 | — | — | 7.57 | 1.49 |
| 9 | Ethyl methacrylate | 14.0 | Styrene | 46.0 | 7.88 | 1.80 |
| 10 | Ethyl methacrylate | 15.0 | Styrene | 8.8 | 7.71 | 1.64 |
| 11 | Ethyl methacrylate | 15.0 | Styrene | 8.8 | 7.71 | 1.64 |
| 12 | Ethyl methacrylate | 15.0 | Styrene | 8.8 | 7.71 | 1.64 |
| 13 | Ethyl methacrylate | 11.2 | — | — | 7.71 | 1.64 |
| 14 | Ethyl methacrylate | 11.5 | — | — | 7.71 | 1.64 |
| 15 | Ethyl methacrylate | 11.5 | — | — | 7.71 | 1.64 |
| 16 | Ethyl methacrylate | 20.2 | Styrene | 36.8 | 7.71 | 1.64 |
| 17 | Ethyl methacrylate | 20.5 | Styrene | 39.9 | 7.71 | 1.64 |
| 18 | Ethyl methacrylate | 2.3 | Styrene | 22.5 | 7.71 | 1.64 |
| 19 | Ethyl methacrylate | 13.0 | Styrene | 7.7 | 11.19 | 1.64 |
| 20 | n-butyl methacrylate | 12.4 | Styrene | 9.1 | 7.71 | 1.08 |
| 21 | t-butyl methacrylate | 12.4 | Styrene | 9.1 | 7.71 | 0.31 |
| 22 | n-butyl acrylate | 13.6 | Styrene | 9.0 | 7.71 | 1.74 |
| 23 | — | — | Styrene | 24.9 | 7.71 | — |
| 24 | Ethyl methacrylate | 18.6 | Styrene<br>Methyl methacrylate | 11.0<br>48.9 | — | 1.64 |
| 25 | Ethyl methacrylate | 3.4 | Styrene | 21.3 | 7.71 | 1.64 |
| 26 | Ethyl methacrylate | 28.9 | Styrene | 9.6 | 7.71 | 1.64 |
| 27 | Ethyl methacrylate | 31.4 | Styrene | 6.9 | 7.71 | 1.64 |
| 28 | Ethyl methacrylate | 17.2 | Styrene | 10.2 | 3.35 | 1.64 |

TABLE 3-1-continued

| | | | | | | |
|---|---|---|---|---|---|---|
| Comparative Example 1 | — | — | Methyl methacrylate | 54.2 | 10.5 | — |
| Comparative Example 2 | — | — | Styrene | 28.3 | 11.19<br>3.50 | — |
| Comparative Example 3 | Ethyl methacrylate<br>Styrene | 8.4<br>14.3 | — | — | 7.49 | 1.41 |
| Comparative Example 4 | Ethyl methacrylate | 8.4 | Styrene | 16.4 | 7.88 | 1.80 |
| Comparative Example 5 | Ethyl methacrylate | 8.5 | Styrene | 9.3 | 7.71 | 1.64 |
| Comparative Example 6 | Ethyl methacrylate | 15.0 | Styrene | 8.8 | 7.71 | 1.64 |
| Comparative Example 7 | Ethyl methacrylate | 7.8 | Styrene | 8.6 | 7.71 | 1.64 |
| Comparative Example 8 | Ethyl methacrylate | 15.0 | Styrene | 8.8 | 7.71 | 1.64 |

In the table, mol % values indicate the content of monomer units derived from monomers in the crystalline resin A.

TABLE 3-2

| | Toner | | Toner | | | Release agent | | Content of crystalline resin A in binder resin |
|---|---|---|---|---|---|---|---|---|
| | | | Tp | ΔH | | | | |
| | No. | Production method | ° C. | J/g | $\Delta H_{Tp-3}/\Delta H$ | Name | Type | mass % |
| Example 1 | 1 | Suspension polymerization method | 61 | 45 | 0.12 | HNP51 | Hydrocarbon | 100 |
| Example 2 | 2 | Suspension polymerization method | 53 | 23 | 0.13 | HNP51 | Hydrocarbon | 100 |
| Example 3 | 3 | Emulsion aggregation method | 61 | 24 | 0.16 | HNP51 | Hydrocarbon | 55 |
| Example 4 | 4 | Suspension polymerization method | 62 | 68 | 0.12 | HNP51 | Hydrocarbon | 100 |
| Example 5 | 5 | Suspension polymerization method | 61 | 44 | 0.19 | HNP51 | Hydrocarbon | 100 |
| Example 6 | 6 | Suspension polymerization method | 60 | 43 | 0.22 | HNP51 | Hydrocarbon | 100 |
| Example 7 | 7 | Suspension polymerization method | 59 | 40 | 0.29 | HNP51 | Hydrocarbon | 100 |
| Example 8 | 8 | Suspension polymerization method | 52 | 39 | 0.12 | HNP51 | Hydrocarbon | 100 |
| Example 9 | 9 | Suspension polymerization method | 68 | 48 | 0.13 | HNP51 | Hydrocarbon | 100 |
| Example 10 | 10 | Suspension polymerization method | 61 | 45 | 0.12 | DP22 | Ester | 100 |
| Example 11 | 11 | Suspension polymerization method | 61 | 45 | 0.12 | FNP90 | Hydrocarbon | 100 |
| Example 12 | 12 | Suspension polymerization method | 61 | 45 | 0.12 | 30050B | Hydrocarbon | 100 |
| Example 13 | 13 | Emulsion aggregation method | 61 | 34 | 0.13 | HNP51 | Hydrocarbon | 55 |
| Example 14 | 14 | Emulsion aggregation method | 62 | 43 | 0.14 | HNP51 | Hydrocarbon | 55 |
| Example 15 | 15 | Emulsion aggregation method | 62 | 37 | 0.14 | HNP51 | Hydrocarbon | 48 |
| Example 16 | 16 | Suspension polymerization method | 53 | 36 | 0.16 | HNP51 | Hydrocarbon | 100 |
| Example 17 | 17 | Suspension polymerization method | 53 | 36 | 0.16 | HNP51 | Hydrocarbon | 100 |
| Example 18 | 18 | Suspension polymerization method | 59 | 42 | 0.15 | HNP51 | Hydrocarbon | 100 |
| Example 19 | 19 | Suspension polymerization method | 61 | 42 | 0.13 | HNP51 | Hydrocarbon | 100 |
| Example 20 | 20 | Suspension polymerization method | 61 | 44 | 0.12 | HNP51 | Hydrocarbon | 100 |
| Example 21 | 21 | Suspension polymerization method | 61 | 42 | 0.13 | HNP51 | Hydrocarbon | 100 |
| Example 22 | 22 | Suspension polymerization method | 59 | 40 | 0.14 | HNP51 | Hydrocarbon | 100 |
| Example 23 | 23 | Suspension polymerization method | 60 | 39 | 0.18 | HNP51 | Hydrocarbon | 100 |
| Example 24 | 24 | Suspension polymerization method | 52 | 38 | 0.22 | HNP51 | Hydrocarbon | 100 |
| Example 25 | 25 | Suspension polymerization method | 60 | 42 | 0.14 | HNP51 | Hydrocarbon | 100 |
| Example 26 | 26 | Suspension polymerization method | 57 | 40 | 0.14 | HNP51 | Hydrocarbon | 100 |
| Example 27 | 27 | Suspension polymerization method | 57 | 40 | 0.14 | HNP51 | Hydrocarbon | 100 |
| Example 28 | 28 | Suspension polymerization method | 53 | 40 | 0.14 | HNP51 | Hydrocarbon | 100 |
| Comparative Example 1 | Comparative toner 1 | Suspension polymerization method | 56 | 85 | 0.23 | HNP10 | Hydrocarbon | 100 |
| Comparative Example 2 | Comparative toner 2 | Suspension polymerization method | 60 | 43 | 0.39 | Carnauba | Ester | 100 |
| Comparative Example 3 | Comparative toner 3 | Suspension polymerization method | 48 | 41 | 0.13 | HNP51 | Hydrocarbon | 100 |
| Comparative Example 4 | Comparative toner 4 | Suspension polymerization method | 74 | 48 | 0.13 | HNP51 | Hydrocarbon | 100 |
| Comparative Example 5 | Comparative toner 5 | Suspension polymerization method | 52 | 19 | 0.13 | HNP51 | Hydrocarbon | 100 |
| Comparative Example 6 | Comparative toner 6 | Emulsion aggregation method | 60 | 17 | 0.18 | HNP51 | Hydrocarbon | 48 |
| Comparative Example 7 | Comparative toner 7 | Suspension polymerization method | 62 | 73 | 0.12 | HNP51 | Hydrocarbon | 100 |
| Comparative Example 8 | Comparative toner 8 | Suspension polymerization method | 58 | 39 | 0.33 | HNP51 | Hydrocarbon | 100 |

TABLE 4

| | | Methyl acrylate $(J/cm^3)^{0.5}$ |
|---|---|---|
| Monomer (a) | Behenyl acrylate | 18.25 |
| | Stearyl acrylate | 18.39 |
| | Myricyl acrylate | 18.08 |
| | Hexadecyl acrylate | 18.47 |
| Monomer (b) | Acrylonitrile | 29.43 |
| | Methacrylonitrile | 25.96 |
| | Acrylic acid | 28.72 |
| | Urea group-containing monomer | 21.74 |
| | Methyl acrylate | 21.60 |
| Monomer (c) | Ethyl methacrylate | 19.88 |
| | n-butyl methacrylate | 19.33 |
| | t-butyl methacrylate | 18.55 |
| | Methyl acrylate | 19.98 |
| the other monomer | Styrene | 20.11 |
| | Methyl acrylate | 20.31 |

Examples 2, 4 to 12 and 16 to 28

Toner particles 2, 4 to 12 and 16 to 28 were obtained in the same way as in Example 1, except that the types and added quantities of monomers used, the type and added quantity of release agent and the temperature and duration of the heat treatment were changed as shown in Table 2. Moreover, the type of release agent is shown in Table 5.

Toners 2, 4 to 12 and 16 to 28 were then obtained by carrying out external addition in the same way as in Example 1. Physical properties of the toners are shown in Tables 3-1 and 3-2, and evaluation results are shown in Table 7.

TABLE 5

| | Name | Type | Melting Point [° C.] |
|---|---|---|---|
| Release agent 1 | HNP51 | Aliphatic hydrocarbon | 77 |
| Release agent 2 | FNP90 | Aliphatic hydrocarbon | 90 |
| Release agent 3 | DP22 (dipentaerythritol hexabehenate) | Ester | 83 |
| Release agent 4 | 30050B (Excerex 30050B) | Aliphatic hydrocarbon | 91 |
| Release agent 5 | HNP10 | Aliphatic hydrocarbon | 83 |
| Release agent 6 | Carnauba wax | Ester | 76 |

Release agents 1, 2 and 5: produced by Nippon Seiro Co., Ltd.
Release agent 4: produced by Mitsui Chemicals Co., Ltd.

Example 3

(Preparation of Crystalline Resin Dispersion 1)

| | |
|---|---|
| Toluene: | 300.0 parts |
| Crystalline resin A1: | 100.0 parts |

These materials were weighed precisely, mixed, and dissolved at 90° C.

Separately, 5.0 parts of sodium dodecylbenzenesulfonate and 10.0 parts of sodium laurate were added to 700.0 parts of ion-exchanged water, and heated and dissolved at 90° C. The previous toluene solution was then mixed with the aqueous solution, and stirred at 7,000 rpm with a T. K. Robomix ultra high-speed mixer (Primix). This was further emulsified under 200 MPa of pressure with a Nanomizer high-pressure impact disperser (Yoshida Kikai). The toluene was then removed with an evaporator, and the concentration was adjusted with ion-exchanged water to obtain a crystalline resin dispersion 1 with a crystalline resin 1 fine particle concentration of 20%.

The 50% volume-based particle diameter (D50) of the crystalline resin 1 fine particle was 0.40 μm as measured with a Nanotrac UPA-EX150 dynamic light scattering particle size distribution meter (Nikki so).

(Preparation of Amorphous Resin Dispersion)

| | |
|---|---|
| Toluene | 300.0 parts |
| Amorphous resin | 100.0 parts |

These materials were weighed precisely, mixed, and dissolved at 90° C.

Separately, 5.0 parts of sodium dodecylbenzenesulfonate and 10.0 parts of sodium laurate were added to 700.0 parts of ion-exchanged water, and heated to dissolve at 90° C. The previous toluene solution was then mixed with the aqueous solution, and stirred at 7,000 rpm with a T. K. Robomix ultra high-speed mixer (Primix).

This was further emulsified under 200 MPa of pressure with a Nanomizer high-pressure impact disperser (Yoshida Kikai). The toluene was then removed with an evaporator, and the concentration was adjusted with ion-exchanged water to obtain an amorphous resin dispersion with a concentration of 20% of the amorphous resin fine particle.

The 50% volume-based particle diameter (D50) of the amorphous resin fine particle was 0.38 μm as measured with a Nanotrac UPA-EX150 dynamic light scattering particle size distribution meter (Nikkiso).

(Preparation of Release Agent Dispersion)

| | |
|---|---|
| Release agent 1 | 100.0 parts |
| Neogen RK anionic surfactant (Daiichi Kogyo Seiyaku) | 5.0 parts |
| Ion-exchanged water | 395.0 parts |

These materials were weighed precisely, loaded into a mixing vessel with an attached stirring device, heated to 90° C., and then dispersed for 60 minutes by recirculating into a Clearmix W-Motion (M Technique). The dispersion conditions were as follows.

| | |
|---|---|
| Outer rotor diameter | 3 cm |
| Clearance | 0.3 mm |
| Rotor speed | 19,000 r/min |
| Screen rotation | 19,000 r/min |

After being dispersed, this was cooled to 40° C. under conditions of rotor speed 1,000 r/min, screen rotation 0 r/min, cooling speed 10° C./min to obtain a release agent dispersion having a concentration of 20% of the release agent fine particle.

The 50% volume-based particle diameter (D50) of the release agent fine particle was 0.15 μm as measured with a Nanotrac UPA-EX150 dynamic light scattering particle size distribution meter (Nikkiso).

(Preparation of Colorant Dispersion)

| | |
|---|---|
| Colorant (Cyan pigment, Dainichi Seika Pigment Blue 15:3) | 50.0 parts |
| Neogen RK anionic surfactant (Daiichi Kogyo Seiyaku) | 7.5 parts |
| Ion-exchanged water | 442.5 parts |

These materials were weighed precisely, mixed, dissolved, and dispersed for 1 hour with a with a Nanomizer high-pressure impact disperser (Yoshida Kikai) to disperse the colorant and obtained a colorant dispersion having a concentration of 10% of the colorant fine particle.

The 50% volume-based particle diameter (D50) of the colorant fine particle was 0.20 μm as measured with a Nanotrac UPA-EX150 dynamic light scattering particle size distribution meter (Nikkiso).

(Production of Toner 3)

| | |
|---|---|
| Crystalline resin dispersion 1: | 275.0 parts |
| Amorphous resin dispersion: | 225.0 parts |
| Release agent dispersion: | 50.0 parts |
| Colorant dispersion: | 80.0 parts |
| Ion exchanged water: | 160.0 parts |

These materials were loaded into a round-bottomed stainless steel flask, and mixed. This was then dispersed for 10 minutes at 5,000 r/min with an Ultra Turrax T50 homogenizer (IKA). 1.0% aqueous nitric acid solution was added to adjust the pH to 3.0, after which the mixture was heated to 58° C. in a heating water bath using a stirring blade while adjusting number of rotations so that the mixture could be stirred.

The volume-average particle diameter of the resulting aggregated particles was checked appropriately with a Coulter Multisizer III, and once aggregated particles with a weight-average particle diameter (D4) of 6.0 μm had formed, the pH was adjusted to 9.0 with a 5% sodium hydroxide aqueous solution. Stirring was then continued as the mixture was heated to 75° C. This was then maintained at 75° C. for 1 hour to fuse the aggregated particles.

Next, the particles were cooled to 45° C. and subjected to a heat treatment for 5 hours.

This was then cooled to 25° C., subjected to filtration and solid-liquid separation, and washed with ion-exchanged water. After completion of washing it was dried with a vacuum drier to obtain a toner particle 3 with a weight-average particle diameter (D4) of 6.07 μm.

Toner 3 was obtained by subjecting toner particle 3 to the same external addition as that carried out in Example 1. Physical properties of toner 3 are shown in Tables 3-1 and 3-2, and evaluation results are shown in Table 7.

Examples 13 to 15

(Preparation of Crystalline Resin Dispersions 2 and 3)

Crystalline resin dispersion 2 was obtained in the same way as crystalline resin dispersion 1, except that the crystalline resin used was changed to crystalline resin A2. In addition, crystalline resin dispersion 3 was obtained in the same way, except that the crystalline resin used was changed to crystalline resin A3.

(Production of Toners 13 to 15)

Toners 13 to 15 were obtained in the same way as in the production of toner 3, except that the type and added quantity of the crystalline resin dispersion used, the added quantity of the amorphous resin dispersion and the duration of the heat treatment were changed as shown in Table 6. Physical properties are shown in Tables 3-1 and 3-2, and evaluation results are shown in Table 7.

TABLE 6

| Example | Polymer dispersion | | Amorphous resin dispersion | Release agent dispersion | Colorant dispersion | Heat treatment | |
|---|---|---|---|---|---|---|---|
| No. | Type | Parts | Parts | Parts | Parts | Temperature (° C.) | Duration (hr) |
| 3 | 1 | 275.0 | 225.0 | 50.0 | 80.0 | 45.0 | 5.0 |
| 13 | 2 | 275.0 | 225.0 | 50.0 | 80.0 | 45.0 | 5.0 |
| 14 | 3 | 275.0 | 225.0 | 50.0 | 80.0 | 45.0 | 5.0 |
| 15 | 3 | 240.0 | 260.0 | 50.0 | 80.0 | 45.0 | 5.0 |
| Comparative Example 6 | 1 | 240.0 | 260.0 | 50.0 | 80.0 | 45.0 | 5.0 |

Comparative Examples 1 to 5, 7 and 8

Comparative toner particles 1 to 5, 7 and 8 were obtained in the same way as in the production of toner 1, except that the types and added quantities of monomers used, the type and added quantity of release agent and the temperature and duration of the heat treatment were changed as shown in Table 2. Physical properties are shown in Tables 3-1 and 3-2, and evaluation results are shown in Table 7.

Comparative Example 6

Comparative toner 6 was obtained in the same way as in the production of toner 3, except that the added quantity of the crystalline resin dispersion used, the added quantity of the amorphous resin dispersion and the duration of the heat treatment were changed as shown in Table 6. Physical properties are shown in Tables 3-1 and 3-2, and evaluation results are shown in Table 7.

<Toner Evaluation Methods>

<1> Low-Temperature Fixability

A process cartridge filled with a toner was allowed to stand for 48 hours in an environment at a temperature of 25° C. and a relative humidity of 40%. Using an LBP-712Ci that had been modified to operate even with the fixing unit removed, an unfixed image was output with an image pattern consisting of 10 mm×10 mm square images arranged at 9 points uniformly across the entire transfer paper. The toner laid-on level on the transfer paper was set at 0.80 mg/$cm^2$, and the fixing onset temperature was evaluated. Fox River Bond (90 g/$m^2$) was used as the transfer paper.

The fixing unit was a fixing unit that was removed from the LBP-712Ci and made to operate as an external fixing unit outside the laser beam printer. Fixing was performed with the external fixing unit at a process speed of 220 mm/sec with the fixing temperature raised in 5° C. increments from 90° C.

The fixed image was verified by eye, and low-temperature fixability was evaluated according to the following criteria by using the lowest temperature at which cold offsetting did not occur as the fixing onset temperature. The evaluation results are shown in Table 7.

[Evaluation Criteria]

A: Fixing onset temperature is 100° C. or lower

B: Fixing onset temperature is from 105° C. to 110° C.

C: Fixing onset temperature is from 115° C. to 120° C.

D: Fixing onset temperature is 120° C. or higher

<2> Heat-Resistant Storage Stability

Heat-resistant storage stability was evaluated to evaluate stability during storage. 6 g of toner was placed in a 100 mL resin cup, and left for 10 days at a temperature of 50° C., a relative humidity of 20%, and the degree of aggregation of the toner was measured as follows and evaluated according to the following standard.

For the measurement unit, a digital display vibration meter (Digivibro Model 1332A, Showa Sokki) was connected to the shaking table side part of a Powder Tester (Hosokawa Micron). A 38 μm (400 mesh) screen, a 75 μm (200 mesh) screen and a 150 μm (100 mesh) screen were then set on the Powder Tester shaking table in that order from bottom to top. Measurement was performed as follows at 23° C., 60% RH.

(1) The vibration width of the shaking table was adjusted in advance so that the displacement value of the digital display vibration meter was 0.60 mm (peak-to-peak).

(2) Toner that had been left for 10 days as described above was left for 24 hours in advance in a 23° C., 60% RH environment, and 5.00 g of this toner was weighed exactly and placed gently on the upper 150 μm screen.

(3) The screens were vibrated for 15 seconds, the mass of the toner remaining on each screen was measured, and aggregation was calculated based on the following formula. The evaluation results are shown in Table 7.

Aggregation (%)={(sample mass (g) on 150 μm screen)/5.00 (g)}×100+{(sample mass (g) on 75 μm screen)/5.00 (g)}×100×0.6+{(sample mass (g) on 38 μm screen)/5.00 (g)}×100×0.2

The evaluation standard is as follows.

A: Aggregation is less than 10.0%

B: Aggregation is from 10.0% to less than 15.0%

C: Aggregation is from 15.0% to less than 20.0%

D: Aggregation is at least 20.0%

<3> Fixed Image Rubfastness

A fixed image was printed using the same method as that used in the evaluation in section <1> above. The fixing temperature was set to be 20° C. higher than the fixing onset temperature. A transparent polyester adhesive tape (Polyester Tape No. 5511 produced by Nichiban Co., Ltd.) was bonded to the fixed image, and a load of 50 g/cm$^2$ was applied. The tape was then peeled off, and the decrease in image density after peeling relative to that before peeling was evaluated as fixed image rubfastness.

Image density was measured using a color reflection densitometer (X-Rite 404A produced by X-Rite, Inc.). The evaluation results are shown in Table 7.

[Evaluation Criteria]

A: Decrease in image density is less than 3.0%

B: Decrease in image density is from 3.0% to less than 7.0%

C: Decrease in image density is from 7.0% to less than 10.0%

D: Decrease in image density is at least 10.0%

<4> Release Properties

The previous printer was used as the evaluation unit, and GF-500 (A4, basis weight 64.0 g/m$^2$, sold by Canon Marketing Japan) as the evaluation paper. The paper feed direction was vertical. An unfixed image was prepared 100 mm wide beginning 5 mm from the leading edge of the evaluation paper in the direction of feed and 200 mm wide in the direction perpendicular to the direction of feed. The toner laid-on level of the unfixed image was 1.2 mg/cm$^2$.

Using the fixing unit described above, the temperature was raised in 5° C. increments beginning at the fixing onset temperature from the low-temperature fixability evaluation, and winding of the fixed image around the fixing roller was measured. The temperature range at which winding did not occur was evaluated as release properties according to the following criteria.

The evaluation results are shown in Table 7.

[Evaluation Criteria]

A: Temperature range without winding: 40° C. or higher

B: Temperature range without winding: 30° C. or higher and less than 40° C.

C: Temperature range without winding: 20° C. or higher and less than 30° C.

D: Temperature range without winding: less than 20° C.

<5> Durability

Durability was evaluated using a commercial Canon LBP712Ci printer. The LBP712Ci uses one-component contact development, and the amount of toner on the developing carrier is regulated by a toner regulating member. For the evaluation cartridge, the toner was removed from a commercial cartridge, the inside was cleaned by air blowing, and the cartridge was filled with 100 g of the toner for evaluation. This cartridge was installed in the cyan station, and the evaluation was performed with dummy cartridges in the other stations.

Using Fox River Bond (90 g/m$^2$) in a 23° C., 60% RH environment, images were continuously output with a print percentage of 1%. A solid image was outputted on the 50th print. A total of 20,000 images were then printed at a print percentage of 1%. After printing 20,000 images, a solid image was outputted again. The decrease in image density on the 20,000th print relative to that on the 50th print was evaluated as durability.

Image density was measured using a color reflection densitometer (X-Rite 404A produced by X-Rite, Inc.). The evaluation results are shown in Table 7.

[Evaluation Criteria]

A: Decrease in image density is less than 5.0%

B: Decrease in image density is from 5.0% to less than 7.0%

C: Decrease in image density is from 7.0% to less than 10.0%

D: Decrease in image density is at least 10.0%

TABLE 7

| Example No. | Toner No. | Low-temperature fixability: Fixing onset temperature (° C.) | Rank | Heat-resistant storage stability: Aggregation | Rank | Fixed image rubfastness: Decrease in image density (%) | Rank | Release properties: Fixing region (° C.) | Rank | Durability: Decrease in image density (%) | Rank |
|---|---|---|---|---|---|---|---|---|---|---|---|
| 1 | 1 | 95 | A | 5.0 | A | 1.8 | A | 60 | A | 3.3 | A |
| 2 | 2 | 115 | C | 18.3 | C | 1.6 | A | 60 | A | 4.0 | A |
| 3 | 3 | 120 | C | 5.8 | A | 1.8 | A | 55 | A | 6.0 | B |
| 4 | 4 | 90 | A | 6.2 | A | 9.3 | C | 60 | A | 4.2 | A |
| 5 | 5 | 95 | A | 7.9 | A | 1.8 | A | 40 | A | 4.2 | A |
| 6 | 6 | 95 | A | 8.2 | A | 1.7 | A | 30 | B | 3.5 | A |
| 7 | 7 | 95 | A | 9.8 | A | 1.9 | A | 20 | C | 3.6 | A |
| 8 | 8 | 90 | A | 18.2 | C | 2.1 | A | 60 | A | 3.3 | A |
| 9 | 9 | 115 | C | 4.3 | A | 2.0 | A | 60 | A | 6.1 | B |
| 10 | 10 | 95 | A | 5.2 | A | 1.8 | A | 60 | A | 4.0 | A |
| 11 | 11 | 95 | A | 4.4 | A | 1.9 | A | 60 | A | 3.9 | A |
| 12 | 12 | 95 | A | 6.3 | A | 2.3 | A | 60 | A | 4.1 | A |
| 13 | 13 | 105 | B | 4.3 | A | 2.1 | A | 60 | A | 5.3 | B |
| 14 | 14 | 95 | A | 5.2 | A | 2.0 | A | 55 | A | 6.3 | B |
| 15 | 15 | 100 | A | 7.2 | A | 1.9 | A | 55 | A | 8.8 | C |
| 16 | 16 | 90 | A | 16.8 | C | 1.8 | A | 45 | A | 4.2 | A |
| 17 | 17 | 90 | A | 19.8 | C | 1.8 | A | 35 | B | 3.3 | A |
| 18 | 18 | 95 | A | 4.9 | A | 1.7 | A | 60 | A | 6.9 | B |
| 19 | 19 | 95 | A | 4.9 | A | 1.9 | A | 60 | A | 4.2 | A |
| 20 | 20 | 95 | A | 4.8 | A | 2.1 | A | 60 | A | 4.5 | A |
| 21 | 21 | 95 | A | 4.9 | A | 1.9 | A | 60 | A | 3.8 | A |
| 22 | 22 | 95 | A | 6.8 | A | 2.1 | A | 60 | A | 6.3 | B |
| 23 | 23 | 95 | A | 7.8 | A | 2.7 | A | 45 | A | 9.2 | C |
| 24 | 24 | 90 | A | 7.9 | A | 2.3 | A | 30 | B | 3.9 | A |
| 25 | 25 | 90 | A | 4.9 | A | 1.7 | A | 60 | A | 4.9 | A |
| 26 | 26 | 95 | A | 7.8 | A | 2.9 | A | 60 | A | 4.4 | A |
| 27 | 27 | 95 | A | 8.8 | A | 4.5 | B | 60 | A | 4.6 | A |
| 28 | 28 | 90 | A | 18.2 | C | 1.8 | A | 60 | A | 3.8 | A |
| Comparative Example 1 | Comparative toner 1 | 90 | A | 12.9 | B | 11.9 | D | 30 | B | 7.8 | C |
| Comparative Example 2 | Comparative toner 2 | 90 | A | 9.9 | A | 2.5 | A | 0 | D | 12.5 | D |
| Comparative Example 3 | Comparative toner 3 | 90 | A | 25.9 | D | 1.8 | A | 60 | A | 4.2 | A |
| Comparative Example 4 | Comparative toner 4 | 125 | D | 4.8 | A | 1.9 | A | 60 | A | 6.2 | B |
| Comparative Example 5 | Comparative toner 5 | 125 | D | 19.2 | C | 2.2 | A | 60 | A | 3.8 | A |
| Comparative Example 6 | Comparative toner 6 | 130 | D | 4.9 | A | 1.9 | A | 50 | A | 8.6 | C |
| Comparative Example 7 | Comparative toner 7 | 90 | A | 5.2 | A | 12.0 | D | 60 | A | 4.2 | A |
| Comparative Example 8 | Comparative toner 8 | 95 | A | 5.8 | A | 2.2 | A | 10 | D | 4.5 | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A toner, comprising:

a toner particle comprising a binder resin and a release agent;

the binder resin comprising a crystalline resin A which comprises monomer units derived from monomers (a), (b) and (c), and a monomer unit derived from a styrene;

monomer (a) being at least one member selected from the group consisting of (meth)acrylic acid esters having an alkyl group with 18 to 36 carbon atoms;

monomer (b) being at least one member selected from the group consisting of methacrylonitrile and acrylonitrile;

monomer (c) being at least one member selected from the group consisting of ethyl methacrylate, n-butyl methacrylate and t-butyl methacrylate; and the release agent being at least one member selected from the group consisting of hydrocarbon-based waxes and ester waxes, wherein $0.20 \leq (SP(c)-SP(a)) \leq 1.80$ when SP(a) denotes the SP value $(J/cm^3)^{0.5}$ of the monomer unit derived from monomer (a) and SP(c) denotes the SP value $(J/cm^3)^{0.5}$ of the monomer unit derived from monomer (c), and in differential scanning calorimetry (DSC) measurements of the toner $$50 \leq Tp \leq 70$$

$$20 \leq \Delta H \leq 70$$

$$0.00 \leq \Delta H_{Tp-3}/\Delta H \leq 0.30$$

when Tp (° C.) denotes peak temperature of an endothermic peak derived from the crystalline resin A in a first temperature increase, ΔH (J/g) denotes an endothermic quantity of the endothermic peak derived from the crystalline resin A in the first temperature increase, and $\Delta H_{Tp\text{-}3}$ (J/g) denotes an endothermic quantity from a temperature 20.0° C. lower than Tp to a temperature 3.0° C. lower than Tp.

2. The toner according to claim 1, wherein $0.00 \leq \Delta H_{Tp\text{-}3}/\Delta H \leq 0.20$.

3. The toner according to claim 1, wherein $3.00 \leq (SP(b)-SP(a)) \leq 25.00$ when SP(a) denotes the SP value $(J/cm^3)^{0.5}$ of the monomer unit derived from monomer (a) and SP(b) denotes the SP value $(J/cm^3)^{0.5}$ of the monomer unit derived from monomer (b).

4. The toner according to claim 3, wherein the monomer unit derived from monomer (a) has a content of 5.0 to 60.0 mol % based on the total number of moles of monomer units in crystalline resin A, and the monomer unit derived from monomer (b) has a content of 20.0 to 95.0 mol % based on the total number of moles of monomer units in crystalline resin A.

5. The toner according to claim 1, wherein the crystalline resin A has a content of 50.0 mass % or more in the binder resin.

6. The toner according to claim 1, wherein the release agent is a hydrocarbon-based wax.

7. The toner according to claim 1, wherein the crystalline resin A comprises a monomer unit derived from a monomer (b) different from the monomer (a), the monomer unit derived from monomer (b) in crystalline resin A has a content of 20.0 to 92.0 mol % based on the total number of moles of monomer units in crystalline resin A, the monomer unit derived from monomer (c) in crystalline resin A has a content of 3.0 to 30.0 mol % based on the total number of moles of monomer units in crystalline resin A, and $3.00 \leq (SP(b)-SP(a)) \leq 25.00$ when SP(a) denotes the SP value $(J/cm^3)^{0.5}$ of the monomer unit derived from monomer (a) and SP(b) denotes the SP value $(J/cm^3)^{0.5}$ of the monomer unit derived from monomer (b).

8. The toner according to claim 1, wherein monomer (a) is at least one member selected from the group consisting of stearyl (meth)acrylate and behenyl (meth)acrylate.

* * * * *